United States Patent [19]
Hosoe

[11] Patent Number: 5,305,088
[45] Date of Patent: Apr. 19, 1994

[54] LASER INTERFEROMETRIC MEASURING MACHINE

[75] Inventor: Shigeru Hosoe, Sagamihara, Japan

[73] Assignee: Konica Corporation, Tokyo, Japan

[21] Appl. No.: 73,292

[22] Filed: Jun. 7, 1993

Related U.S. Application Data

[63] Continuation of Ser. No. 624,345, Dec. 7, 1990, abandoned.

[30] Foreign Application Priority Data

Dec. 11, 1989 [JP] Japan .................................. 1-320939
Apr. 18, 1990 [JP] Japan .................................. 2-102739

[51] Int. Cl.$^5$ .............................................. G01B 9/02
[52] U.S. Cl. ..................................... 356/351; 356/349
[58] Field of Search ................................ 356/349, 351

[56] References Cited

U.S. PATENT DOCUMENTS 3,454,340 7/1969 Nomarski ............................ 356/350
4,802,764 2/1989 Young et al. ........................ 356/351

FOREIGN PATENT DOCUMENTS 0250306 6/1987 European Pat. Off. .
3404963 2/1984 Fed. Rep. of Germany .
CH90/00008 1/1990 PCT Int'l Appl. .

Primary Examiner—Samuel A. Turner
Assistant Examiner—LaCharles P. Keesee, II
Attorney, Agent, or Firm—Finnegan, Henderson, Farabow, Garrett & Dunner

[57] ABSTRACT

The invention provides a laser interferometric measuring apparatus in which there is provided a corner-cube prism which includs a reflecting surface for selectively reflecting or transmitting a beam in accordance with the polarization condition of the beam and a transmitting surface for sending out a beam. A light source, a movable mirror, a fixed mirror, a detector and the corner-cube prism so arranged that the corner-cube prism receives a reference beam and a measuring beam from the light source through the reflecting surface, sends out the reference beam to the fixed mirror and the measuring beam to the movable mirror respectively through the transmitting surface, receives the reflected reference beam from the fixed mirror and the reflected measuring beam from the movable mirror through the transmitting surface and selectively sends out the reflected reference beam and the reflected measuring beam to the detector in accordance with their polarization condition through the reflecting surface.

19 Claims, 15 Drawing Sheets

→ BEAM-ENTERING/EXITING
---- MEASURING BEAM
— REFERENCE BEAM

TOTAL REFLECTION SURFACE OR REFLECTING SURFACE

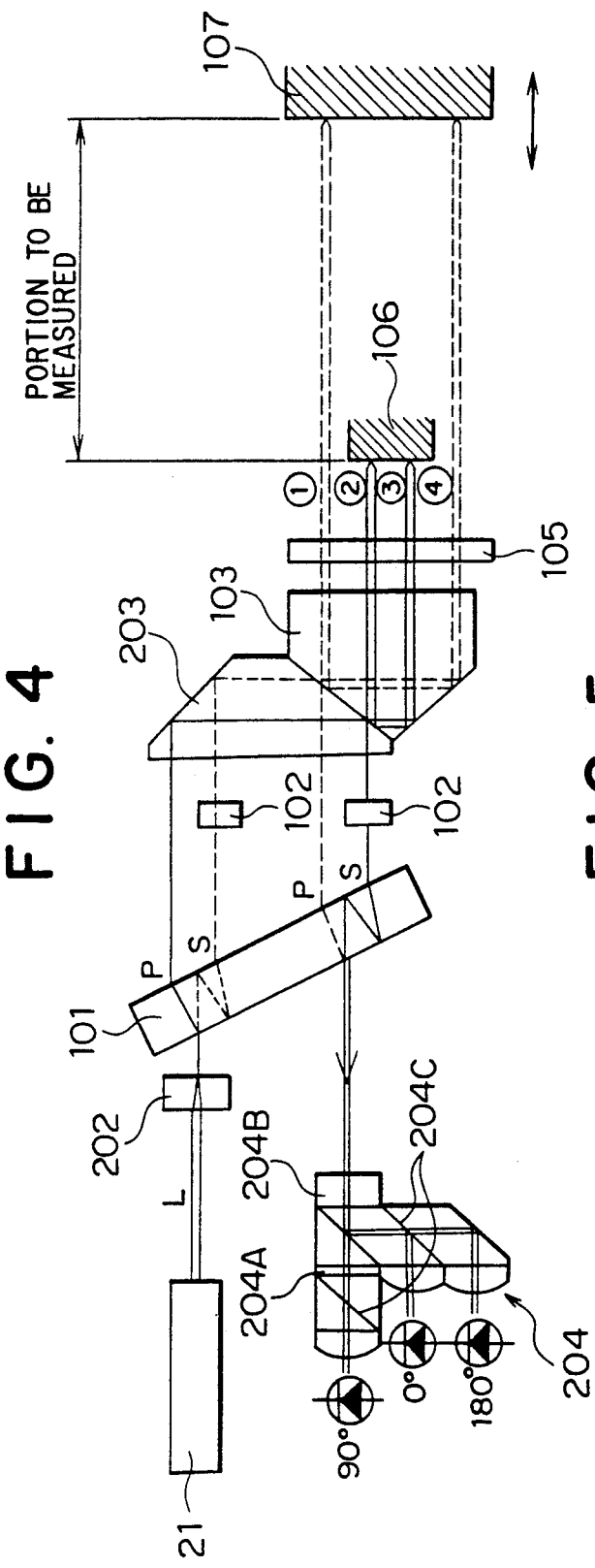
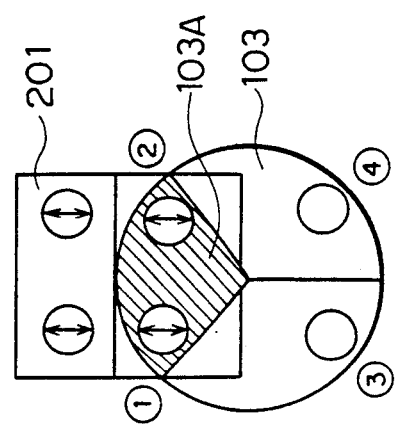
FIG. 4
FIG. 5

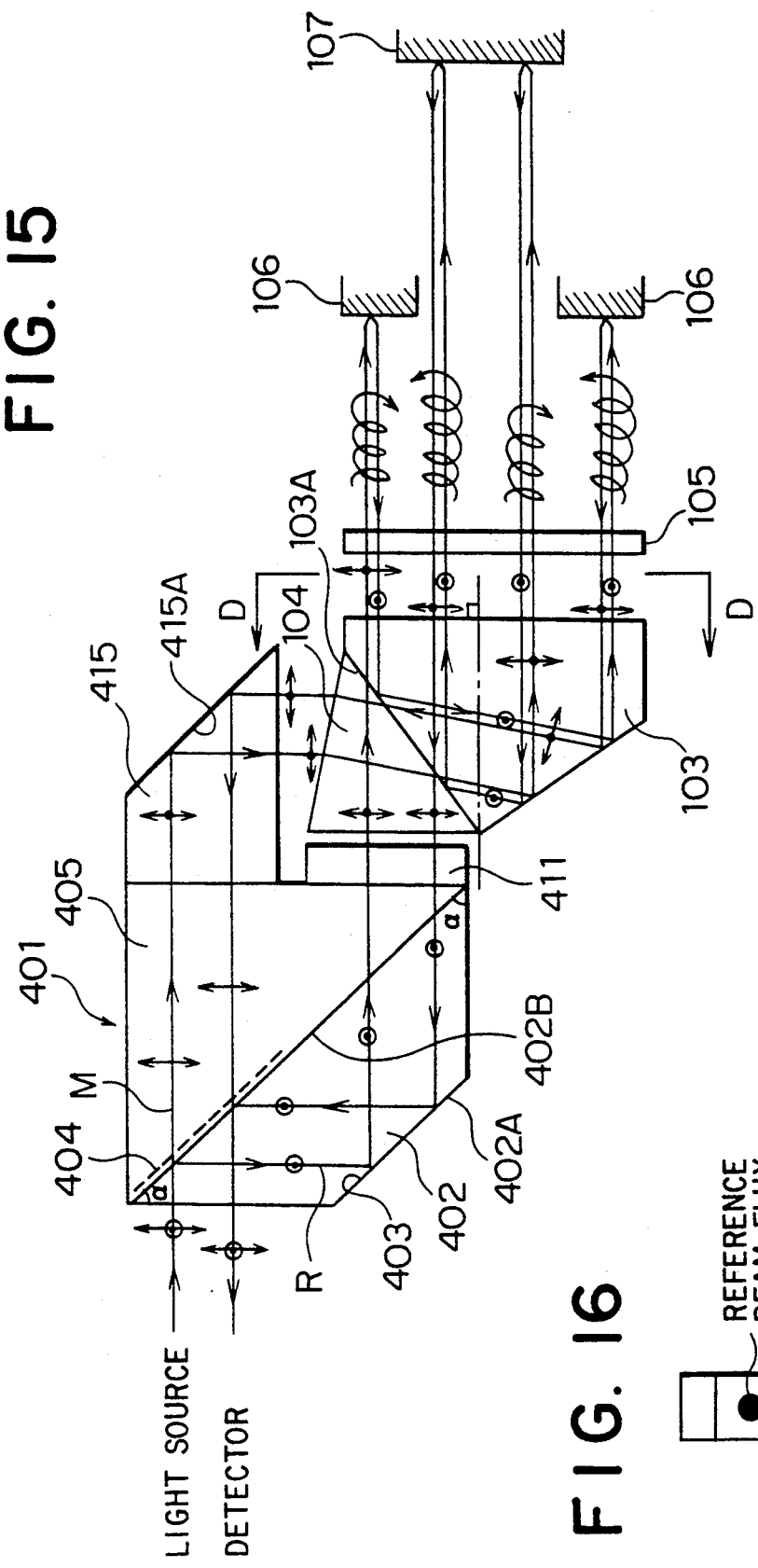

LASER INTERFEROMETRIC MEASURING MACHINE

This application is a continuation of application Ser. No. 07/624,345, filed Dec. 7, 1990, now abandoned.

BACKGROUND OF THE INVENTION

The present invention relates to a laser interferometric measuring machine, and particularly to one that is less affected by disturbance, reasonable in price and highly accurate.

In order to achieve the resolving power of 0.1 $\mu$m or the higher resolving power than that for measurement in a conventional interferometric measuring machine, there is employed a method wherein a gas laser or a semiconductor laser is used as a light source, and its beam is split into a reference beam and a measuring beam and thus measurement (displacement) information is obtained by observing interference fringes and beats after aligning the beam that returns from an object to be measured with the reference beam to be coaxial again.

All interferometers are based on the type of a Michelson interferometer shown in FIG. 17 in terms of constitutional arrangement. Namely, a beam from light source 20 is split into a reference beam and a measuring beam by beam splitter 21, and the measuring beam that reflects on movable mirror 22 attached on an object to be measured is aligned by beam splitter 21 to be coaxial with the beam reflected on fixed mirror 23, thus, interference fringes are generated. Depending on a method for detecting measurement information, there are two different systems; one is an interference fringe counting system wherein the number of density changes in an interference fringe generated by a returned beam is counted and the other is a heterodyne system wherein a plurality of coherent light having different wavelengths are used to cause a beat and a frequency fluctuation of the beat is detected utilizing a Doppler shift of frequency of the measuring beam caused by the moving speed of the object to be measured.

Optical arrangement of the former system mentioned above is shown in FIG. 27, and it is described in detail in the known documents written by M. J. Dowhs and K. W. Raihel including detected signals processing. Namely, in the laser-based measuring machine mentioned above, a linearly polarized beam emitted from stabilized laser 101 is split by beam splitter 102 into a reference beam path including $\lambda/8$ plate 103 as well as fixed corner-cube 104 and a measuring beam path including movable corner-cube 105. The reference beam split to follow the reference beam path, after passing through $\lambda/8$ plate 103 twice, is converted to a circularly polarized beam which is aligned again by beam splitter 102 to be coaxial with a linearly polarized beam of a measuring beam that is split to follow the measuring beam path, and then is separated into two. One of the two beams is further split by polarized beam splitter 106 into two so that the measuring beam becomes separated beams each being in the directions of $\pm 45°$ against the polarization surface of the measuring beam. Three kinds of separated beams obtained in the aforesaid manner, after they pass through filter 107 and polarization plate 108, are converted to three kinds of interference fringe intensities whose phases, which interfere with the movement of movable corner-cube 105 in the arrowed direction, are deviated by 90° in succession, and these three kinds of interference fringe intensities enter detector 109 respectively to be converted to three kinds of electric signals each having a phase difference of 90°. After these three kinds of electric signals are amplified by amplifier 110 respectively, they are grouped into two groups each having two adjacent electric signals differing in terms of phase by 90°. A change in the length of the measuring beam path is obtained from at least one of the electric signals changing with Sin $\theta$ and Cos $\theta$ (wherein, $\theta = 2\pi(Lm - Lr)/\lambda$, Lm . . . length of measuring beam path, Lr . . . length of reference beam path, $\lambda$ . . . wavelength) deviated by 90° in terms of phase and obtained through the input of electric signals of two groups into subtracter 111, and a direction of the change is obtained from both of the electric signals.

Namely, in this laser-based measuring machine, three kinds of interference fringe signals differing in terms of phase by 90° in succession are obtained through utilization of a principle of polarization of a laser beam, and from the difference of signals between two adjacent and successive interference fringes, the signals which are used for measurement of a change and a direction of the change in the length of a measuring beam path and change with aforesaid Sin $\theta$ and Cos $\theta$. Therefore, influence of disturbance such as a fluctuation in intensity of a laser beam is offset and thereby the center of a signal level is kept constant continually, resulting in less erroneous counting of interference fringes and higher accuracy of measurement. Owing to this, accurate counting of interference fringes is realized even when the disturbance affects the intensity of a counting beam to be changed by about 90%. Furthermore, the interference fringe counting system may use the optical arrangement as shown in FIG. 18 in which a circularly polarized light is used as a light source. In this case, the same interferometric measuring device as that of the latter one of the heterodyne system may be used. Namely, linearly polarized light emitted from stabilized laser 20A passes through $\lambda/4$ phase shifter 24 where it is converted to a circularly polarized beam, and then is split by polarized beam splitter 21 into a reference beam and a measuring beam. The measuring beam reflects off of movable mirror 22 and returns to polarized beam splitter 21, during the course of which the measuring beam, when it passes through $\lambda/4$ phase shifter 25 twice, is converted to the beam whose polarization directions cross at right angles. This is reflected off of polarized beam splitter 21. Then, it is reflected off of fixed mirror 23 and is aligned to be coaxial with the reference beam which has passed polarized beam splitter 21 after passing through $\lambda/4$ phase shifter 25 twice and being converted in terms of polarization direction. Here, no interference is caused because the polarization direction of the reference beam and that of the measuring beam cross at right angles. However, when common polarization component is extracted, through beam splitter 26, by polarizers 27 and 29, interference fringes are generated. The number of density changes in an interference fringe thus generated is detected by detectors 28 and 30, and in this case, polarizers 27 and 29 are arranged so that polarized beams crossing at right angles can be extracted for the purpose of discriminating the moving direction of movable mirror 22.

Optical system of the latter system mentioned above is shown in FIG. 19, and it is described in detail in the known documents PRECISION ENGINEERING Vol. 5. No. 3 (1983) 111 written by L. J. Wuerz and R. C. Quenelle. Namely, a beam emitted from 2-frequency Zeeman laser 20B generating two circularly polarized beams having respectively frequency f1 and frequency f2 and rotating reversely each other is changed by the λ/4 phase shifter 24 to a linearly polarized beam having planes of polarization crossing at right angles to each other. After passing through the beam splitter 34 and the polarizer 31, a beat (f1−f2) caused by frequencies f1 and f2 is detected by detector 32. A beam reflected on movable mirror 22 is subjected, due to a Doppler effect, to a frequency change δf corresponding to a moving speed, and thereby the beat detected by detector 33 is based on (f1−f2±δf). Thus, displacement information of an object can be obtained through the comparison subtraction between beat frequencies detected by both detectors 32 and 33. Incidentally, due to polarized beam splitter 35, beam f1 and beam f2 are detected respectively by detector 36 and detector 37 and the detected results are inputted in laser synchronization circuit 38.

In both examples, the resolving power for measurement covering even electrical processing is as extremely high as 0.01 μm, and for the purpose of maintaining this resolving power at a highly accurate level, the frequency of laser light source is stabilized within an accuracy of $10^{-6}$–$10^{-8}$.

Further, as an example of how to stabilize detected signals against disturbance in a heterodyne system, there is known a method having an interferometric measuring machine provided with an optical path of a differential type shown in FIG. 20.

In FIG. 20, a measuring beam takes the path shown with a solid line of polarized beam splitter 21→λ/4 phase shifter 25.movable mirror (prism) 22→polarized beam splitter 21→prism 40→polarized beam splitter 21→λ/4 phase shifter 25.movable mirror 22→polarized beam splitter 21→mirror 43→λ/4 phase shifter 25.prism 41→mirror 43→polarized beam splitter 21→prism 39→polarized beam splitter 21→exiting.

A reference beam takes the path shown with a dotted line of polarized beam splitter 21→prism 39→polarized beam splitter 21→mirror 41→λ/4 phase shifter 25.prism 41→mirror 43→polarized beam splitter 21→λ/4 phase shifter 25.fixed mirror (reflecting mirror) 42→polarized beam splitter 21→prism 40→polarized beam splitter 21→λ/4 phase shifter 25.fixed mirror 42→polarized beam splitter 21→exiting.

In this way, it is possible to stabilize detected signals remarkably by making the length of an optical path of a reference beam and that of a measuring beam to be the same in an interferometric measuring machine wherein a beam of frequency-stabilized laser is split into a reference beam and a measuring beam, because the disturbance such as a temperature change or the like affects both beams equally.

As is apparent from FIG. 20, however, a conventional interferometric measuring machine of a differential type is extremely complicated in structure and large in size, and the length of an optical path in measuring prism is markedly long, which acts as a negative factor for enhancing the stability against disturbance.

Actually, the resolving power for measurement is 5 nm in the example shown in FIG. 20.

Further, as shown in FIG. 21, there is a method wherein a high stability peculiar to an interferometer of a differential type is realized by decreasing the number of optical elements and shortening the length of an optical path in the interferometer as shown in FIG. 21.

Similarly to the one shown in FIG. 20, the method in FIG. 21 is of a heterodyne system wherein two laser beams having different frequencies (or wavelengths) and linear polarization crossing at right angles are caused to enter polarization shearing plate 50. Then, the beam that is a linearly polarized beam of S-component selectively reflects repeatedly and thus takes a separate optical path shifted from the optical path of a P-component beam. In the known example, an amount of the shift is about 12 mm.

Further, polarization of the S-component beam is converted to a P-component type after it passes through λ/2 phase shifter (λ/2 wavelength plate, λ/2 phase plate) 51, thus, both beams of different wavelengths are caused to enter polarized beam splitter 52 as a P-component. Then, both beams of different wavelengths pass through polarized beam splitter 52 and polarized circularly by λ/4 phase shifter (λ/4 phase plate, λ/4 wavelength plate) 53, and the reference beam and the measuring beam are caused respectively by fixed mirror (reference mirror) 54 and movable mirror (plane mirror) 55 to return taking their same optical paths. Since both returning beams pass through λ/4 phase shifter 53 again, they are converted to S-component polarization and reflect off of the surface 52A of the polarized beam splitter. Further, they are caused to return by cornercube prism (or mirror) 56 to surface 52A of the polarized beam splitter and reflect from that surface to advance respectively to fixed mirror 54 and movable mirror 55 where they reflect, and then are subjected to conversion by means of λ/4 phase shifter 53 and exit polarized beam splitter 52 as P-component. A beam of other wavelength is converted by λ/2 phase shifter 51' and is shifted by polarization shearing plate 50 to the same optical path and is led to a detection optical system.

The example shown in FIG. 21, compared with the one shown in FIG. 20, has less optical elements and has an optical path that is relatively short. Therefore, its stability against disturbance is easily improved and its resolving power for measurement is 1.25 nm.

In both conventional examples in FIGS. 20 and 21 mentioned above, the stability against disturbance and measuring accuracy are enhanced in an interferometer of a differential type by making both measurement direction and reference direction the same.

Strictly speaking, however, both of them can not be regarded as a method of a perfectly differential type. The reason is that the reference beam and the measuring beam are not coaxial, being shifted by about several millimeters though they are in the same direction in both conventional examples. Even the portion from the incident point to the fixed mirror, which is generally called a common path, is not a perfect common optical path. Namely, even in such a common path, the reference beam and the measuring beam are not equally affected by disturbances such as a temperature change and air flicker, though the difference between them is small.

Therefore, even in an interferometer of a differential type similar to the conventional examples, it is an important point to shorten the optical path in the interferometer to stabilize and improve the measurement accuracy.

In the past, however, a differential type has required an optical path with a complicated deflection path, resulting in the inconsistency of a long optical path.

Even the length of the common optical path in FIG. 21 exceeds 200 mm, and it is nearly twice the length of that in an interferometer of a non-differential type. This is a problem.

In view of the situation mentioned above, the first object of the invention is to realize an inexpensive and accurate laser interferometric measuring machine wherein the length of an optical path is minimized and the number of optical elements is decreased. Thus, the accuracy for measurement against disturbance is stably maintained.

The present invention further relates to a laser-based measuring machine wherein a beam emitted from a laser is split by a splitting means into a reference beam and a measuring beam. After both beams are aligned to be coaxial, they are optically split into 2-phase or 3-phase interference beams whose phases deviate by 90 degrees. Thereby, the phase change and the direction of the change in the length of measuring optical path are measured based upon electrical signals obtained by detecting aforesaid interference beams.

As an example of the laser-based measuring machine mentioned above, there is known a laser-based measuring machine of an interference fringe-counting type shown in FIG. 27.

A conventional laser-based measuring machine of aforesaid type, however, has the disadvantage that not only does polarized beam splitter 106 need to be positioned accurately against beam splitter 102 but also each one of three kinds of separated beam paths need to be provided accurately with a filter 107 and a polarization plate 108.

The second object of the invention is to provide a laser-based measuring machine of an interference fringe-counting type wherein a plurality of optical elements, which split a beam optically into 2-phase or 3-phase interference beams, can be positioned easily and accurately. The third object of the invention is to provide a laser-based measuring machine wherein three kinds of interference fringe signals, each differing in terms of phase by 90° which are for obtaining signals which are not affected by disturbance such as a fluctuation in intensity of a laser beam and change with aforesaid Sin $\theta$ and Cos $\theta$, are obtained from the signals detected from 2-phase interference beams. The fourth object of the invention is to offer a laser-based measuring machine in which it is easy to accurately adjust the phase difference to be 90° between 2-phase interference beams obtained through optical splitting.

SUMMARY OF THE INVENTION

In order to achieve the object mentioned above, the invention provides a laser interferometric measuring machine in which there is employed a corner-cube prism or a corner-cube mirror with at least one reflecting surface which can transmit or reflect selectively the beams having different polarization conditions.

It is preferable in the interferometric measuring machine mentioned above that a prism be attached to the surface of the aforesaid corner-cube prism transmitting or reflecting selectively the beams having different polarization conditions, and that the aforesaid surface transmitting or reflecting selectively the beams having different polarization conditions be set to form an angle of 45 degrees with the direction of measurement.

It is further preferable that the aforesaid attached prism can rotate around an axis that is normal to the aforesaid surface which transmits or reflects selectively the beams having different polarization conditions, and thus the incident direction and the exiting direction of a beam can be changed.

Further, it is preferable to provide a compensation prism that changes the directions of an incident beam and an exiting beam to the transmitting surface of aforesaid corner-cube prism.

It is further acceptable that one of transmitting surfaces of aforesaid attached prism be parallel with the transmitting surface of aforesaid corner-cube prism, and further, that angle $\theta_2$ formed by the surface which is not the attachment surface among the transmitting surfaces of aforesaid attached prism and which is not parallel with the transmitting surface of the corner-cube prism or with the attachment surface, and that angle $\theta$, formed by the transmitting surface of the corner-cube prism and the attachment surface, satisfy the following relation;

$$-\cos(\theta+\theta_2)=n \sin(\theta_2-\theta)$$

wherein, n represents a refraction index for both corner-cube prism and the prism attached thereto. In this case, angle $\theta$ formed by the reflecting surface and the transmitting surface of the corner-cube prism is caused to be $\cos^{-1}(\sqrt{33})$, namely, an ordinary corner-cube prism is used.

Further, it is preferable that the incident point and exiting point of the reference beam and the measuring beam on the transmitting surface of the corner-cube prism be aligned.

It is further preferable that the reflecting surface, other than the surface of aforesaid corner-cube prism transmitting or reflecting selectively the beams having different polarization conditions, be provided with a dielectric-reflecting film.

In the arrangement mentioned above, it is possible, by using a corner-cube prism or mirror in place of a conventional polarized beam splitter, to realize a laser interferometric measuring machine wherein the length of an optical path in the interferometer is short despite a differential type optical arrangement. Also, the number of optical elements is decreased and thereby the stability against disturbance is secured. Measuring accuracy is improved and easy operation is assured.

In a laser-based measuring machine wherein a beam emitted from a laser is split by a splitting means into a reference beam and a measuring beam, and after both beams are aligned to be coaxial, they are split into 2-phase or 3-phase interference beams whose phases are deviated optically by 90 degrees, and thereby a change and the direction of the change in the length of measuring optical path are measured based upon electrical signals obtained by detecting aforesaid interference beams, the present invention is characterized in that a beam-45°-rotating plate is included in a plurality of optical elements mentioned above which split a beam optically into interference beams, and adjacent optical elements among the plural optical elements are in contact with each other and further are solidly cemented together either totally or partially. Due to the constitution mentioned above, the first object is achieved and the second object is further achieved in a manner that 2-phase interference beams whose phases are deviated by 90° from each other are split optically by a plurality of optical elements. Further, from either one of two kinds of electric signals obtained by detecting the interference beams, three kinds of electric signals whose phases are deviated by 180° from the aforesaid interference beams are obtained. Further, the aforesaid third object is achieved by causing a wavelength plate, that is used for an interference beam at one side and has retardation of λ/4 and over, or a polarized beam splitter, positioned downstream to the wavelength plate that adjoins it, to be rotatable for adjustment around an optical axis for the occasion when 2-phase interference beams whose phases are deviated by 90° are split optically by a plurality of optical elements.

Namely, in the laser-based measuring machine of the present invention, since a beam-45°-rotating plate is included in the plurality of optical elements which split a beam optically into 2-phase or 3-phase interference beams and whose phases are deviated by 90° in succession, a beam splitter arranged as a 45° prism that splits the beam, wherein a reference beam and a measuring beam are aligned to be coaxial, into two can be arranged to be in parallel, in terms of its side, with a polarized beam splitter, formed as a 45° prism and used for splitting a laser beam into two laser beams respectively for a reference beam path and for a measuring beam path and further for aligning the reference beam and the measuring beam to be coaxial. Further, since a plurality of optical elements, which split optically a beam into 2-phase or 3-phase interference beams whose phases are deviated by 90° in succession, such as a beam-45°-rotating plate and a beam splitter are in contact each other side by side and are cemented together either totally or partially, these plural optical elements can be arranged easily and a beam can be split accurately into interference beams. Furthermore, when a plurality of optical elements, which split a beam optically into interference beams, operate together to split a beam into 2-phase interference beams, the number of the plurality of optical elements can be reduced and these optical elements can easily be positioned and cemented together. When electric signals deviating by 180° in terms of the interference fringe phase are obtained from either one of electric signals obtained the detection of the 2-phase interference beams, the phase difference between the two, in three kinds of interference fringe signals, can exactly be 90°. Further, when a wavelength plate having retardation of λ/4 or more, used for interference beam on one side among a plurality of optical elements which split a beam optically into 2-phase interference beams, or a polarized beam splitter, positioned downstream the wavelength plate to adjoin it, is caused to be rotatable for adjustment around an optical axis, it is possible to easily make a phase of a 2-phase interference beam thus obtained to be 90° accurately, allowing a plurality of optical elements to be positioned and cemented more easily.

BRIEF DESCRIPTION OF THE DRAWINGS

FIG. 2 (B) is a side view thereof;

FIG. 4 is an illustration of the second example of the invention;

FIG. 5 is an illustrative drawing of a corner-cube prism, first separated in the direction perpendicular to the drawing, then shifted and viewed from the movable mirror side;

FIG. 15 is an illustration of the example wherein a reference beam and a measuring beam, when they exit from a transmission surface of a corner-cube prism, are aligned;

FIG. 16 shows the example of FIG. 15 viewed in the direction marked with an arrow D;

DETAILED DESCRIPTION OF THE PREFERRED EMBODIMENTS

Figure 1:
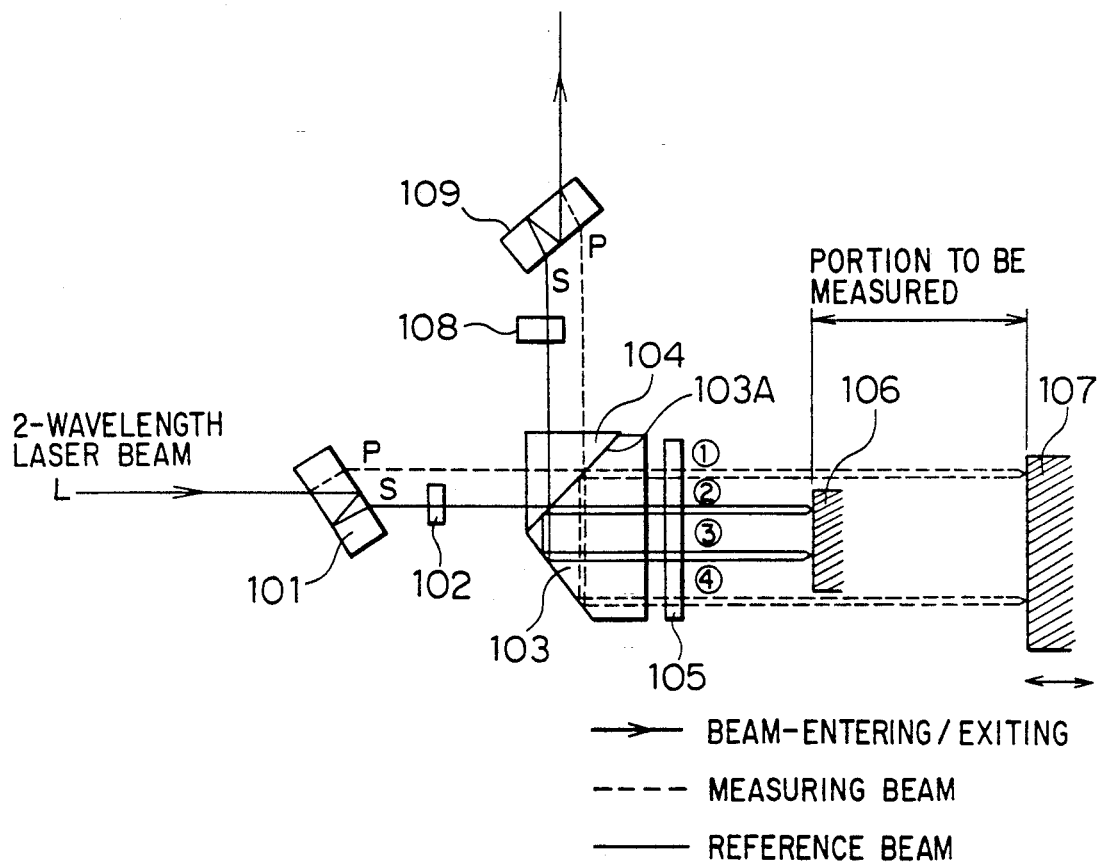
FIG. 1 shows basic constitution of a laser interferometric measuring machine of the present invention.

An example to achieve the first object of the invention will be explained first in detail as follows, referring to the drawings.

Figures 2A, 2B:
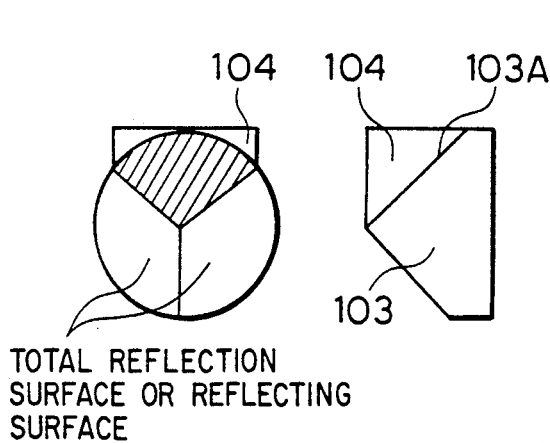
FIG. 2 (A) is a front view of a corner-cube prism.

FIG. 1 illustrates the outline of an example of a laser interferometric measuring machine of a heterodyne type based on the present invention, and FIG. 2(A) is a front view of a corner-cube prism, and FIG. 2(B) is a side view thereof.

When two linearly polarized laser beams L, having different wave-lengths crossing at right angles to each other, enter a laser interferometric measuring machine, a beam with S-component wavelength among the two beams is shifted by a polarized beam shearing plate 101 and then is converted by a λ/2 phase shifter 102 into P-component.

With regard to corner-cube prism 103 used herein, one of reflecting surfaces thereof is coated (with a vacuum evaporated film). The film forms a polarized beam splitting surface 103A with a triangular prism 104 attached thereon. Incidentally, the other reflecting surfaces thereof may be totally reflective surfaces without being coated, but they may also be provided with a metallic reflecting film or with a dielectric reflecting film.

Two beams having different wavelengths enter the aforesaid corner-cube prism 103 as a P-components and are transmitted therethrough. Then, they pass through a λ/4 phase shifter 105, and the reference beam and the measuring beam, both caused to make one round trip by fixed mirror 106 and movable mirror 107, respectively, are converted into S-components in terms of polarization condition. Therefore, the beams, capable of passing through when they enter, are reflected on polarized beam splitting surface 103A and are caused by fixed mirror 106 and movable mirror 107, respectively, to make another single round trip. The returning beams thereof are converted into P-components by λ/4 phase shifter 105 in terms of polarization. These beams, therefore, now pass through polarized beam splitting surface 103A. These transmitted beams become the beams which are coaxial and cross at right angles to one another, having been linearly polarized by polarized beam shearing plate 109 after having passed through another λ/2 phase shifter 108, similar to the λ/2 phase shifter 102 on the occasion of entering. With regard to these beams, measurement information can be detected by the existing detecting optical system after preparing detecting elements crossing each other at 45 degrees.

Figure 3:
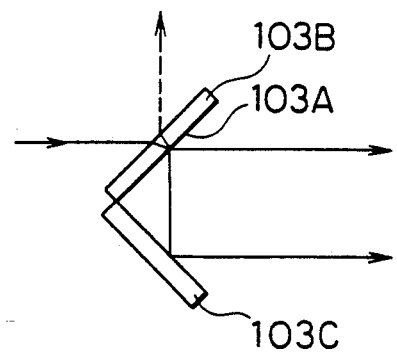
FIG. 3 is a cross-sectional view of a corner-cube mirror.

FIG. 3 is a sectional view of a corner-cube mirror. This is a combination of two mirrors, 103B and 103C, which cross at right angles to each other. The combination is substituted for the arrangement of the corner-cube prism 103 and the triangular prism 104.

FIG. 4 is a structural diagram of an optical system showing the second example of a laser interferometric measuring machine of the invention.

In this diagram, both the incident beam and exigent beam are caused to be in the same direction by reflecting prism 203, for the purpose of easy operation of the device. It is an example of the present invention, a measuring machine of an interference fringe counting type where a λ/4 phase shifter 202 is provided at a portion of the incident beam. The reflecting prism 203 may naturally be substituted by a mirror.

Laser beam L, with a single, linearly polarized frequency emitted from the frequency-stabilized laser 201, is circularly polarized by λ/4 phase shifter 202. Then the circularly polarized beam is converted repeatedly to a P-component and a S-component in exactly the same manner as in the heterodyne type. Finally, the reference beam and the measuring beam become the beams which are linearly polarized and cross at right angles to one another to be detected. In the present example, interference fringes in 3-phase polarization directions are detected through the combination of the λ/4 phase shifter 204A and the 45 degrees beam rotating plate 204B as well as a compound prism (phase separation prism) 204 on which polarized beam splitting surface 204C is formed.

In the examples of FIGS. 1 and 4, the reference beam and the measuring beam are separated by the polarized beam shearing plate and are shifted in a direction parallel with the plane of the drawing. The invention, however, is not limited to this construction.

FIG. 5, representing the third example of the preferred embodiment, shows the reflected beam in the corner-cube prism (mirror) 103 as viewed from the movable mirror when the beam is separated and shifted in the direction perpendicular to the plane of the drawing. Numbers given to structural members are the same as those in FIGS. 1 and 4. When the beams are separated and shifted in such a direction, it is possible to miniaturize the corner-cube prism, the fixed mirror and the movable mirror.

Figure 20:
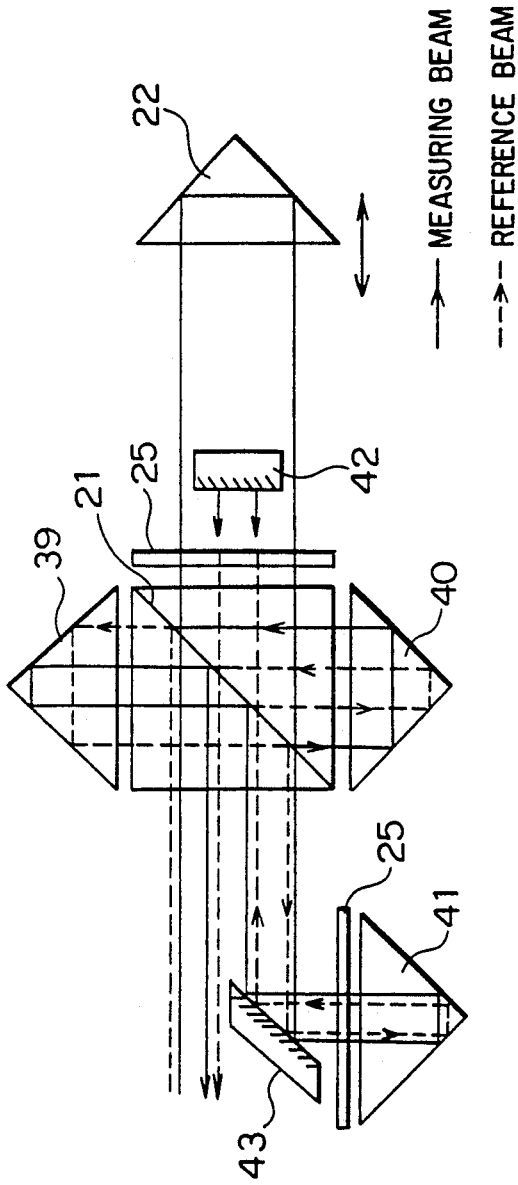
FIGS. 20 and 21 represent an interferometer of a differential type.
Figure 21:
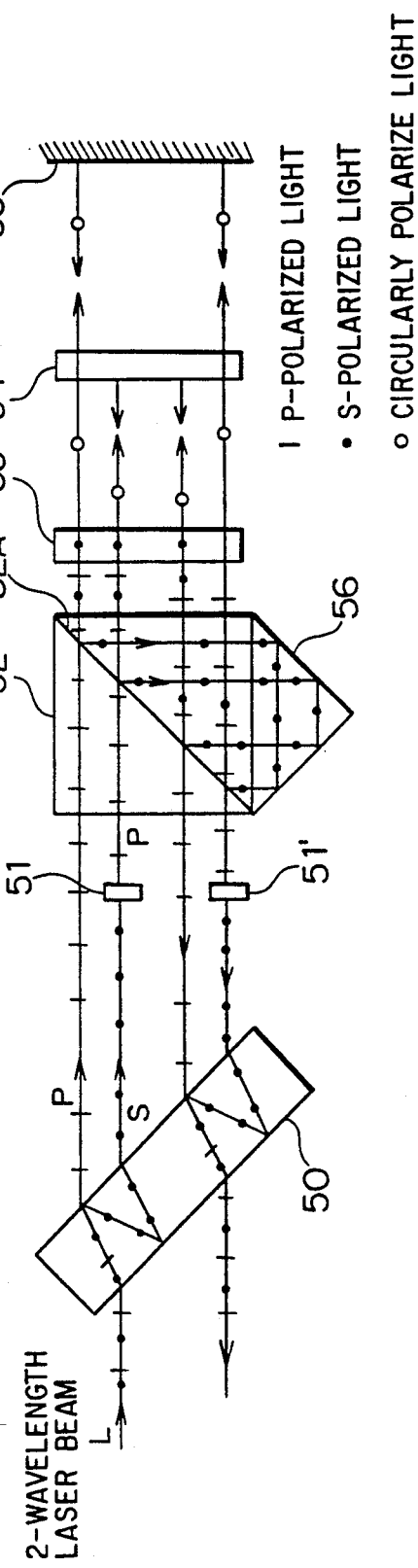

In the invention shown in FIGS. 1, 4 and 5, the polarized beam splitter 21, used in a conventional cubic prism as shown in FIGS. 20 and 21, is not used at all, and thereby it is possible to make the length of the optical path in an interferometer shorter than 50 mm. Further, with regard to the main body prism portion (excluding a fixed mirror, a movable mirror and a beam shifter) combined with a corner-cube prism, the four reflecting surfaces and five transmitting surfaces which were required in the past have been changed to four reflecting surfaces including a reflecting prism and three transmitting surfaces in the optical system of the present invention. Furthermore, the number of reflecting surfaces can even be reduced to two when a mirror is used in place of the reflecting prism.

Owing to the foregoing, it is possible to reduce remarkably the processing time for optical surfaces including the time required for processing of anti-reflection coating. Further, with regard to the optical element used in main body prism portion, it is possible to reduce cost and size, because no polarized beam splitter is used which employs a conventional cubic prism that is expensive and bulky. When it is possible to miniaturize the optical element, even when it is affected by disturbances such as a temperature change, it tends to be stable even in a short period of time, which enables the measurement accuracy to be improved and stabilized, together with a shortened length of an optical path.

Further, the sharp decrease in the number of transmitting surfaces reduces the amount of reflected light at the transmitting surfaces and can significantly reduce intensity modulation components of stray light which may superpose on the detected signals. Thus, the linearity of measurement values can be improved greatly even when the transmitting surface is treated with anti-reflection coating.

When setting the measuring machine, the corner-cube prism (or mirror) 103 in the main body prism portion directly reflects both the reference beam and the measuring beam, and therefore, an adjustment for aligning optical axes is extremely easy. In the conventional method for using a cubic prism as a polarized beam splitter, a corner-cube prism is provided at the tip of a deflected beam. When setting a main body prism portion of the conventional example, therefore, an adjustment including tilt components and shift components was required. In the present invention, however, the apex of a corner-cube prism serves as an adjustment axis, and therefore, an adjustment for setting a main body prism includes only a shift adjustment of the fixed mirror and the movable mirror, and does not include a tilt adjustment. This leads to easy operation especially when a fixed mirror and a movable mirror are planar mirrors.

Figure 6:
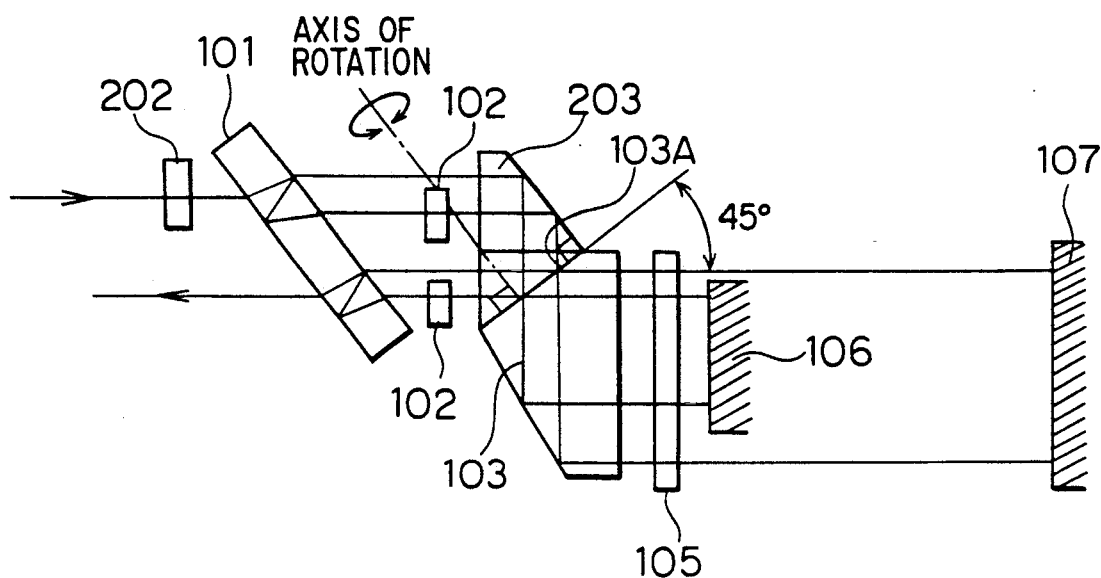
FIG. 6 is an illustrative drawing showing the fourth example of the invention wherein a corner-cube prism is set to an angle of 45 degrees and a reflecting prism is rotatable.

In FIG. 6, showing the fourth example of the present invention, the polarized beam splitting surface 103A is set at 45 degrees with a measurement direction, and the reflecting prism 203 is provided so that it can rotate around an axis perpendicular to the polarized beam splitting surface.

Figure 7:
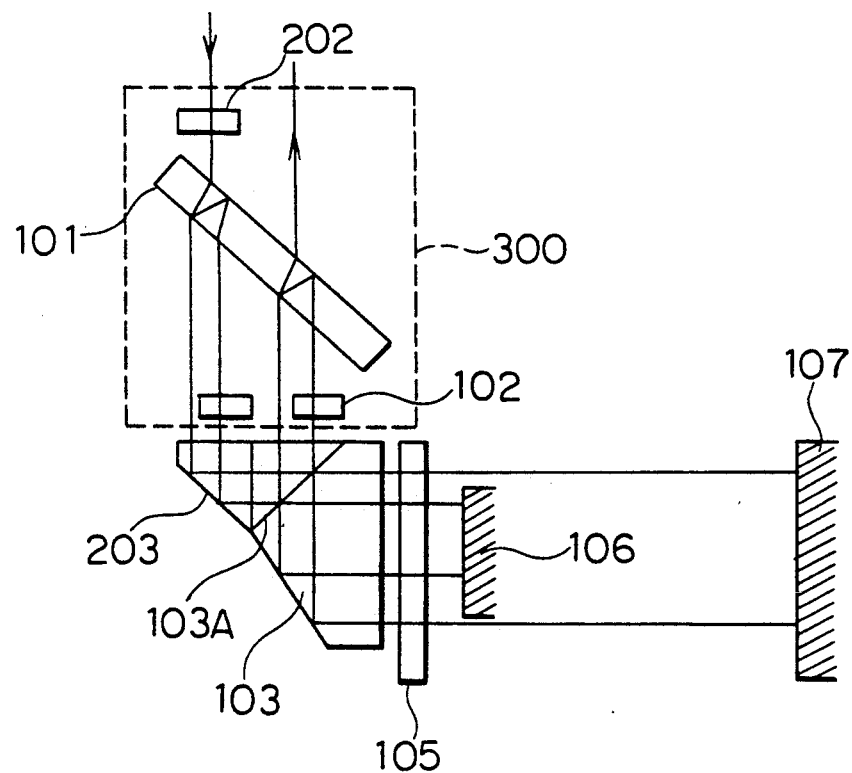
FIG. 7 is an illustration wherein the prism is rotated to an angle of 180 degrees, and measurement direction and beam-entering direction form an angle of 90 degrees with respect to one another.

It is possible, without using other optical elements, to form a right angle with the measurement direction and the direction of beam-entering/exiting the device merely by turning the beam-shifting portion 300 and the reflecting prism 203 to an angle of 180 degrees as shown in FIG. 7. Naturally, it is possible to change the direction of the beam-entering/exiting the device by dismounting reflecting prism 203 and changing its direction to an angle of 180 degrees, without using a rotating device.

Figure 8:
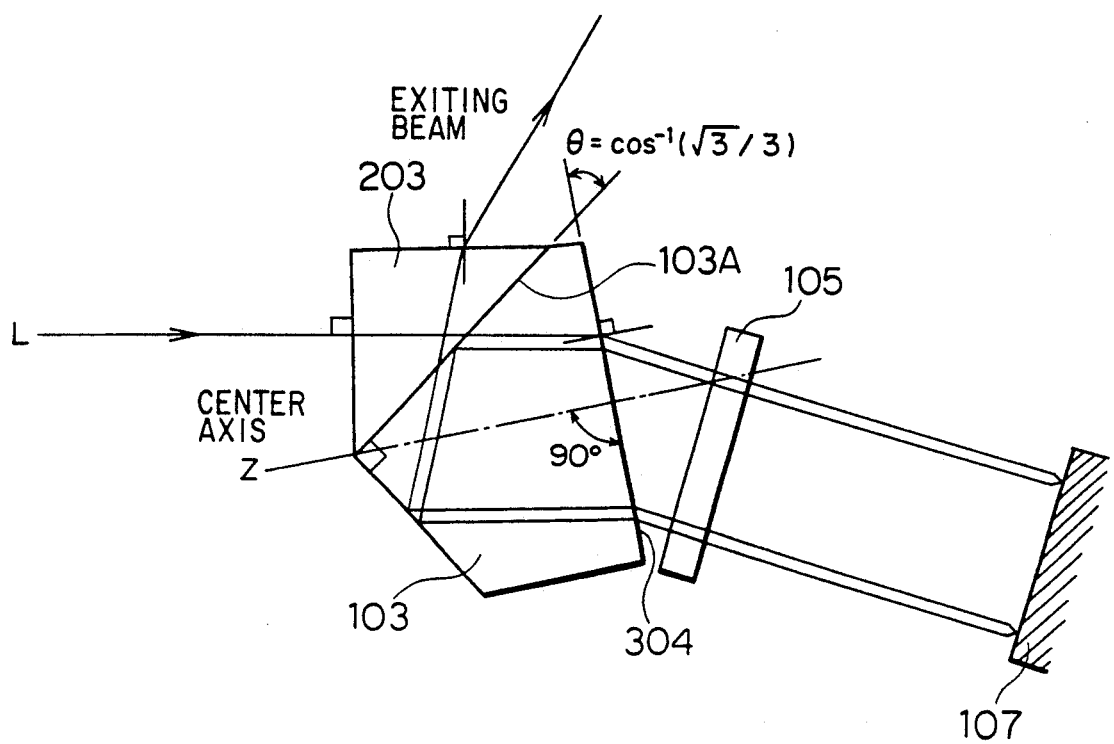
FIGS. 8 and 9 represent an illustrative diagram showing how the measurement direction and beam-entering direction form 90 degrees accurately.

In this case, however, an ordinary corner-cube prism is made so that the transmission surface is almost perpendicular to the center axis [a straight line making an angle of $$\theta = Cos^{-1}(\sqrt{3}3)$$

with the normal line vector to each reflecting surface] for three reflecting surfaces. Therefore, in a strict sense, when the polarized beam splitting surface which selectively transmits or reflects a beam according to polarization conditions is arranged to make an angle of 45 degrees with center axis Z (as shown in FIGS. 6 and 7), the incident angle of the beam to the corner-cube prism 103 is not 90 degrees as in FIG. 8. This makes the device difficult to operate.

When the transmission surface 304 of corner-cube prism 103 is inclined at an angle of $$\theta = Cos^{-1}(\sqrt{3}3) - 45°( = 9.73561.)$$

and is set to form 45° with the polarized beam splitting surface 103A, the angle of an entering beam and an exiting beam against corner-cube prism 103 becomes 90 degrees (as shown in FIGS. 6 and 7). The external circumference of the corner-cube prism is not naturally coaxial with the center axis Z. Therefore, centering around an axis that passes a vertex and makes an angle of 45 degrees with polarized beam splitting surface 103A leads to an easy operation.

Figure 9:
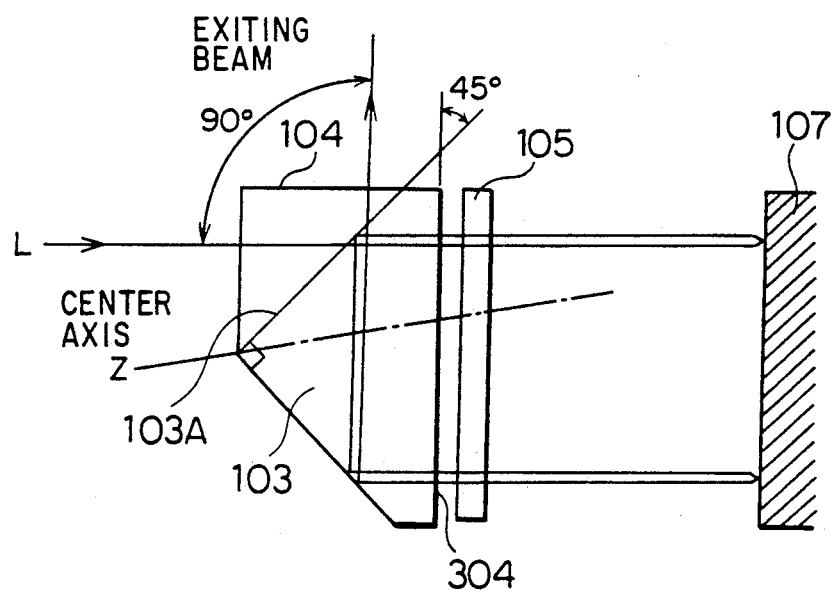
Figure 10:
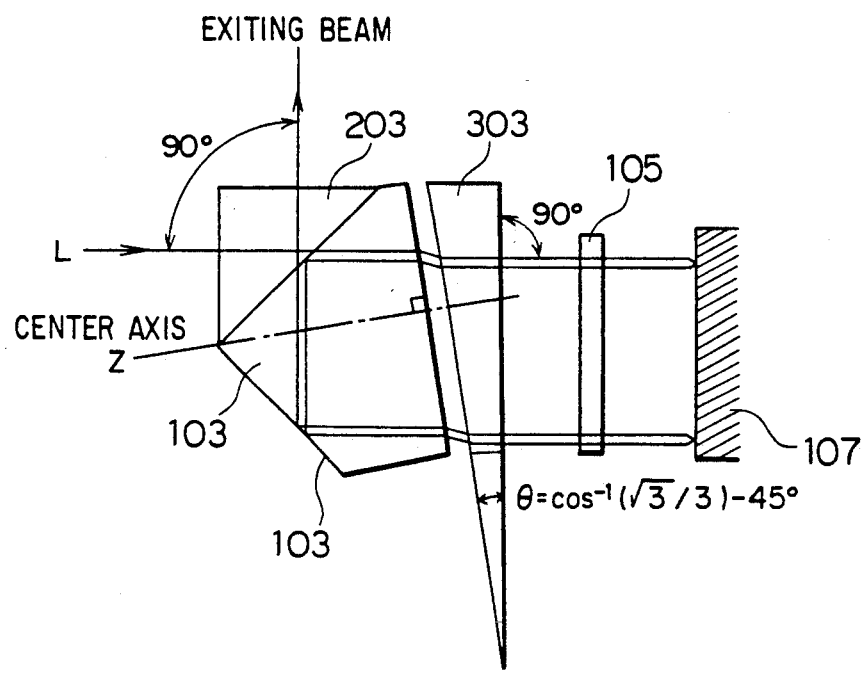
FIG. 10 shows an example wherein a compensating prism is used.

Using an ordinary corner-cube prism is equivalent to providing a compensation prism 303 for vertical angle $\theta'$ as shown in FIG. 10. In order to avoid repeated reflection between parallel planes, however, it is better if compensation prism 303 is cemented to corner-cube prism 103, if possible. In any event, beams in the optical systems as depicted in FIGS. 6-10 are used with an incident angle of about 45 degrees to the corner-cube prism. Therefore, it is better that the reflecting surface is coated with a vacuum-deposited film when glass of a low refractive index (e.g., quartz) is used for the prism.

In the aforesaid example of FIG. 9, an angle of 90 degrees made by an incident beam and an exiting beam is maintained and an incident beam and a measuring beam are kept to be coaxial both by changing an angle made by a transmitting surface and a reflecting surface of the corner-cube prism. An example shown in FIG. 11 is also acceptable.

Figure 11:
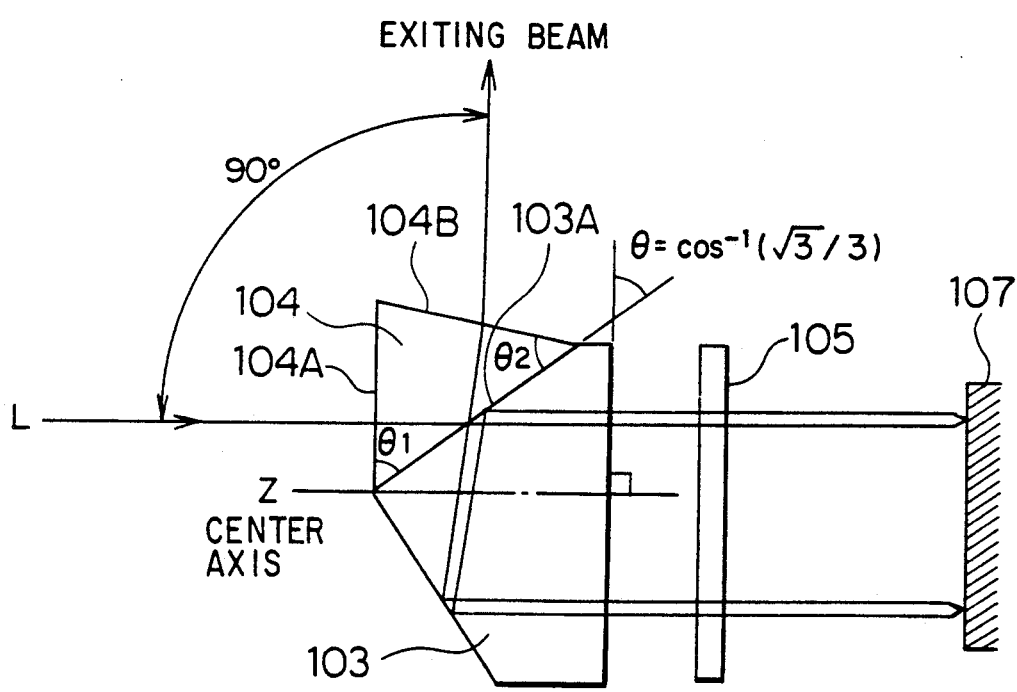
FIG. 11 shows an example related to the shape of the prism cemented.

In FIG. 11, ordinary corner-cube prism (with a transmitting surface perpendicular to a central axis) 103 is used, and one surface 104 of transmitting surfaces of prism 104, cemented to the aforesaid corner-cube prism, is arranged to be parallel with a transmitting surface of the corner-cube prism 103. Namely, the condition of $\theta_1 = \theta$ is satisfied.

Further, it is arranged that $\theta_2$, made by surface 104B which is not a cemented surface among the transmitting surfaces of aforesaid prism 104 and is not parallel to a transmitting surface of corner-cube prism 103 and a cemented surface, as well as $\theta$, made by a transmitting surface of corner-cube prism 103 and a cemented surface, are arranged to satisfy the following equation;

$$-Cos(\theta + \theta_2) = n \sin(\theta_2 - \theta)$$

(wherein, n represents a refractive index of both a corner-cube prism and a prism cemented thereto).

Incidentally, since ordinary corner-cube prism 103 is used, an angle $\theta$ made by a reflecting surface and a transmitting surface of the corner-cube prism is $Cos^{-1}(\sqrt{3}3)$.

The example shown in FIG. 11 depicts the advantage where an unnecessary reflected beam is caused not to be coaxial by changing a vertical angle of a cemented prism while using a conventional corner-cube prism.

In the example in FIG. 9, on the other hand, due to the reflecting surface of the corner-cube prism 103 that is not totally reflective, the device needs a reflection-intensifying coating. The reason for this is that the number of reflection made during a period of the two round trips of the beam is four. Each reflection reduces the intensity of returned beam to one half or less of the original intensity if no reflection-intensifying coating is present.

In the example in FIG. 11, on the other hand, the reflection is made at a critical angle to realize total reflection, which does not need reflection-intensifying coating.

Figure 12:
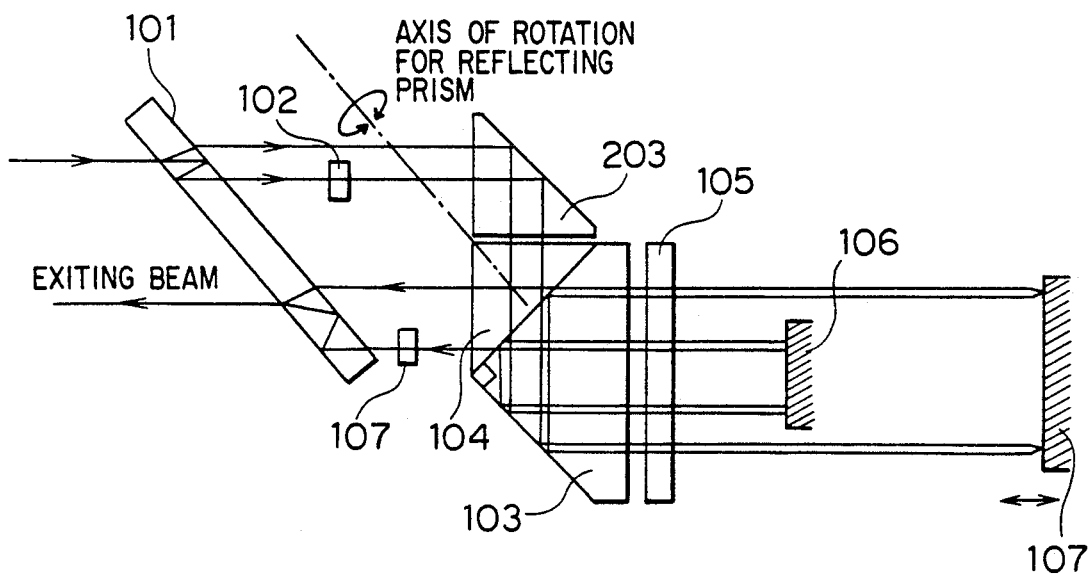
FIG. 12 shows an example summarizing the present invention.
Figure 13:
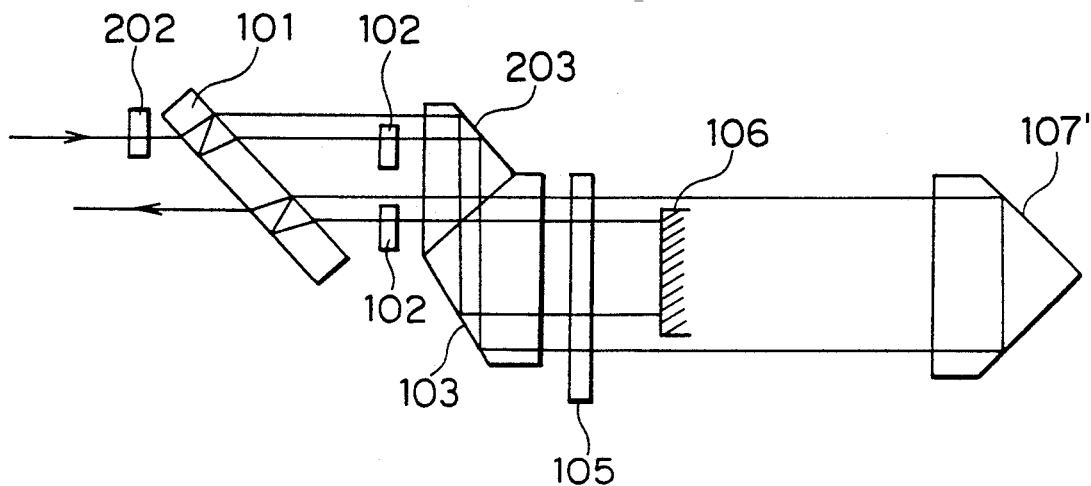
FIG. 13 shows an example wherein a corner-cube prism is used only in place of a movable mirror.
Figure 14:
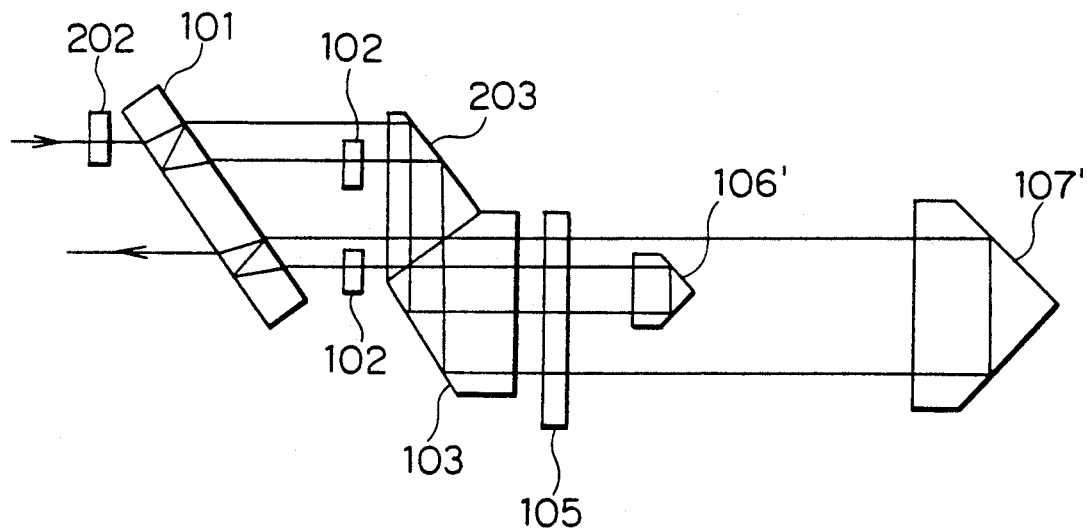
FIG. 14 is an illustration of the example wherein corner-cube mirrors are used both in place of a fixed mirror and a movable mirror.
Figure 17:
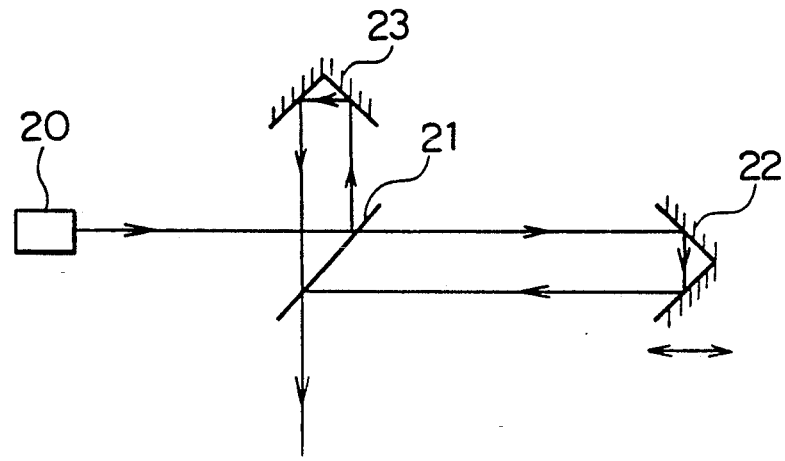
FIG. 17 is an illustration of a conventional interferometer of a Michelson type.
Figure 18:
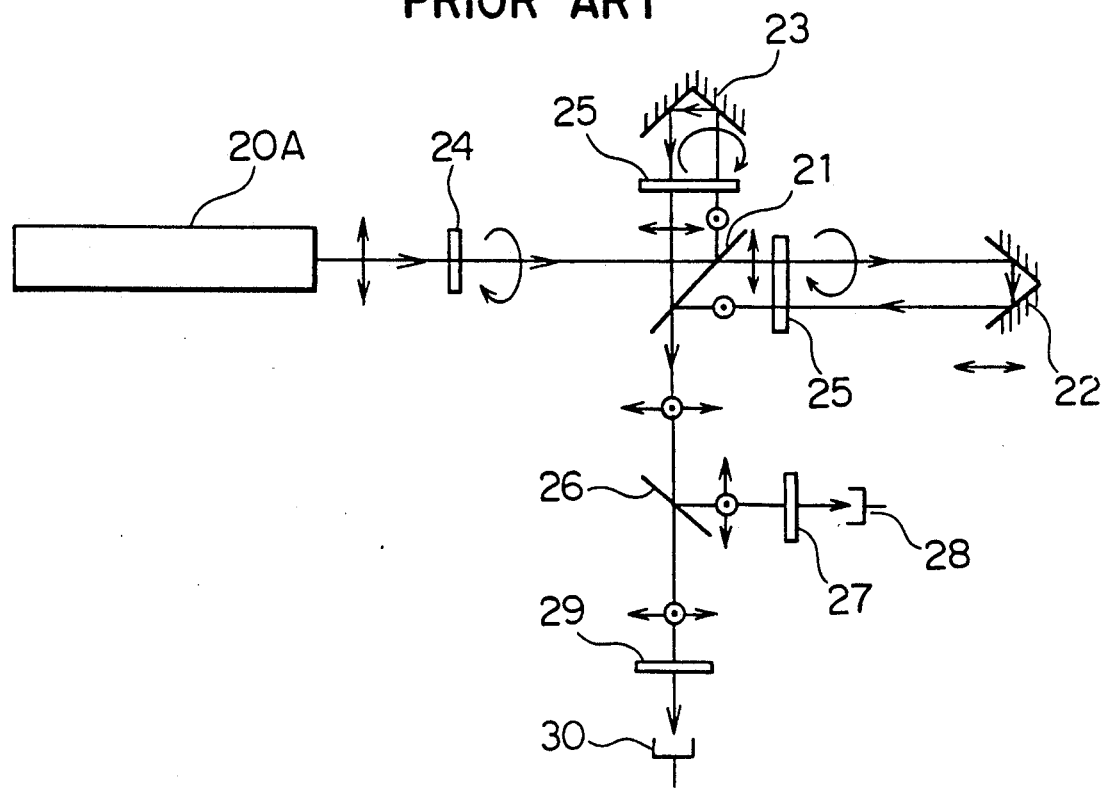
FIG. 18 shows an interferometer of an interference fringe-counting type.
Figure 19:
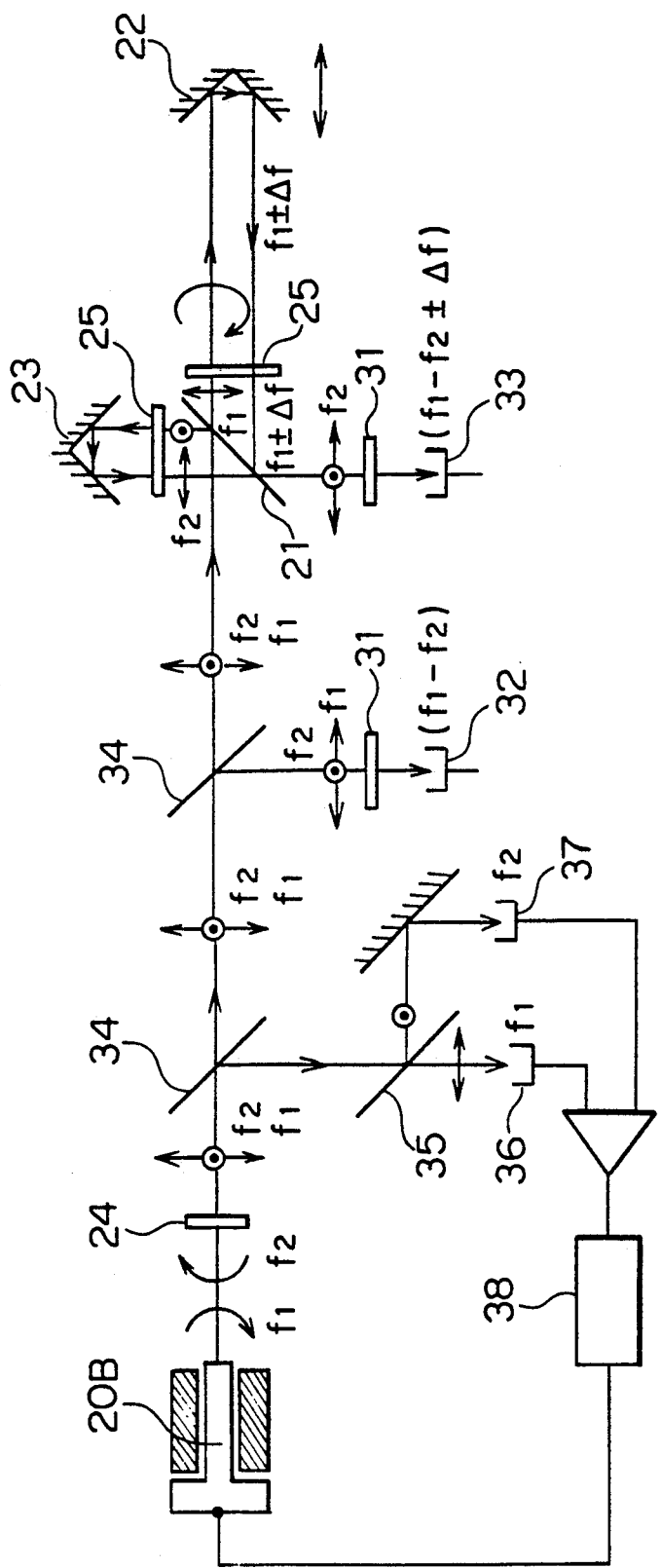
FIG. 19 is a basic diagram of an interferometer of a heterodyne type.

An example summarizing the foregoing is shown in FIG. 12, and with regard to the beam-shift direction, the optical system in FIG. 5 is smaller than that in FIG. 12. When a prism is replaced with a mirror, stray light is reduced, though the optical system becomes less maintainable. In FIG. 13, movable mirror 107 only is replaced with corner-cube prism 107', while in FIG. 14, fixed mirror 106 and movable mirror 107 are replaced respectively with corner-cube prism 106' and corner-cube prism 107'.

In both examples mentioned above, setting the alignment adjustment is easy. This means that both examples (embodiments) are free from a strict accuracy for alignment since the distance between the main body prism and the fixed mirror 106 as well as movable mirror 107 becomes longer. Therefore, both of them are especially useful for measurement of a relatively long distance. Further, it is possible to organize an interferometric measuring machine of an interference fringe-counting type by inserting λ/4 phase shifter 202 in an incident portion.

Next, an explanation will be given for an example shown in FIG. 15 where the positions of the incident beam and the exigent beam on a transmitting surface of the corner-cube prism for both a reference beam and a measuring beam are aligned.

In FIG. 15, polarized beam splitter 401 is composed of parallel-plate prism 402 and triangular prism 405.

Aforesaid parallel-plate prism 402 is formed to be trapezoidal in cross-sectional view, and further is formed so that included angle α, at each edge of the end face 402B between both end faces 402A and 402B which face each other in parallel, is 45 degrees. On most of aforesaid end face 402A, reflecting surface (total reflecting surface) 403 is formed, while on about half of aforesaid end face 402B, polarized beam split coating 404 is provided.

Through the manner mentioned above, triangular prism 405 is cemented to parallel-plate prism 402 on which reflecting surface 403 and polarized beam split coating 404 are provided. Aforesaid triangular prism 405 is formed so that its cross section is an equilateral right-angled triangle whose vertical angle is 90 degrees, and the base of triangular prism 405 subtending the vertical angle is cemented to end face 402B of aforesaid parallel-plate prism 402 by means of adhesives.

A laser beam emitted from an unillustrated light source enters polarized beam splitter 401 as a linearly polarized beam having polarization surfaces crossing at right angles each other. The laser beam is split into measuring beam M (polarization direction is shown by the mark ⟵⟶ in the figure), that passes through polarized beam split coating 404 at aforesaid polarized beam splitter 401, and reference beam R (polarization direction is shown with ⊙ in the figure), that reflects off of polarized beam split coating 404 and off of reflecting surface 403 and becomes parallel with aforesaid measuring beam M.

Reference beam R, which reflects off of polarized beam split coating 404 and off of reflecting surface 403 and passes through and is emitted from the transmitting portion where no polarized beam split coating 404 is provided on parallel-plate prism 402, is converted in terms of polarization direction by λ/2 phase plate (90-degree rotating plate) 411 which is cemented to triangular prism of polarized beam splitter 401 so that polarization directions cross at right angles (in the direction of ⟵⟶). After that, reference beam R enters corner-cube prism 103 through prism 104. Polarized beam splitting surface 103A of the corner-cube prism 103 transmits only the beam of polarization direction shown with ⟵⟶ from among the beams with polarization directions shown with ⟵⟶ and the polarization direction ⊙ perpendicular to it. Therefore, aforesaid reference beam R passes through polarized beam splitting surface 103A directly and then is converted to a circularly polarized beam after passing through λ/4 phase plate 105.

Reference beam R, circularly polarized, reflects at right angles off of fixed mirror 106 and passes through λ/4 phase plate 105 again to be converted to the polarization direction shown with ⊙ in the figure which is polarization direction reflecting on polarized beam splitting surface 103A. Therefore, reference beam R returning from fixed mirror 106 reflects on polarized beam splitting surface 103A and then advances toward fixed mirror 106 a second time due to the reflecting surface (or total reflection surface) of corner-cube prism 103.

In this case, the beam is again converted by λ/4 phase plate 105 to a circularly polarized beam which reflects off of fixed mirror 106, returns and passes through λ/4 phase plate 105 to be converted to the polarization direction shown with ⟵⟶ which is a transmission polarization direction of polarized beam splitting surface 103A. Therefore, reference beam R, reflected twice from the fixed mirror 106 and returned to corner-cube prism 103, directly passes in the direction perpendicular to that of both the beam exiting from polarized beam splitter 401 and the one exiting from polarized beam splitting surface 103A and then is reflected and refracted on reflecting surface (or total reflecting surface) 415A of prism 415 in the direction parallel to that of the beam exiting from polarized beam splitter 401. It is then returned again to polarized beam splitter 401.

Reference beam R, after returning, to polarized beam splitter 401, passes through polarized beam split coating 404, advances directly and exits from polarized beam splitter 401 in the direction parallel to the beam emitted from the light source.

On the other hand, measuring beam M, with polarization direction shown by ⟵⟶ which passes through polarized beam split coating 404 is deflected by aforesaid prism 415 through an angle of 90 degrees, and then it passes through polarized beam splitting surface 103A of corner-cube prism 103 and is reflected onto the reflecting surface of corner-cube prism 103.

Such measuring beam M passes through aforesaid λ/4 phase plate 105 and is thereby converted into a circularly polarized beam. Then, the measuring beam M reflects at right angles off of movable mirror 107 attached to the subject to be measured and passes through λ/4 phase plate 105 again to be converted, in terms of polarization direction, to the polarized direction shown with a ⊙ in the figure. Therefore, the measuring beam is reflected on polarized beam M splitting surface 103A and advances again toward movable mirror 107.

In this case, though the measuring beam passes through λ/4 phase plate 105 and is thereby converted into a circularly polarized beam, it passes through λ/4 phase plate 105 a second time after being reflected from movable mirror 107, and it is converted, in terms of polarization direction, to the polarization direction shown with a ⊙ in the figure. Therefore, the measuring beam passes through polarized beam splitting surface 103A of corner-cube prism 103 and enters the λ/2 phase plate (beam-90°-rotating plate) 411 where the measuring beam is converted, in terms of polarization direction, to the polarization direction shown with a ⊙ in the figure.

Then, the measuring beam M passes through the transmission portion which is not provided with polarized beam split coating 404 on parallel-plate prism 402 of polarized beam splitter 401. The measuring beam M is reflected on reflecting surface 403. Thereupon, the reflected beam arrives at polarized beam split coating 404 where the reflected beam reflects thereon without entering thereinto because of its polarization direction, that is the reflecting direction. The beam thus reflected is aligned to be coaxial with aforesaid returned reference beam R and exits from polarized beam splitter 401 to enter the detector (not shown).

In the arrangement mentioned above, when FIG. 15 is viewed in the direction marked with an arrow D, the measuring beam (◯) and the reference beam (◯), when they exit the transmission surface of corner-cube prism 103, are aligned as shown in FIG. 16, resulting in an advantage that corner-cube prism 103 or the like can be of a thin and compact type. Further, each beam can be positioned to be close each other, resulting in a great effect of a differential type and a high stability against fluctuation. Furthermore, due to the advantage of a compact type mentioned above, the length of an optical path can be shortened and, thereby, external disturbances such as temperature changes are small and the stability of measurement can be improved.

Incidentally, reflecting surfaces of aforesaid corner-cube prism 103, other than a surface thereof that transmits or reflects beams of different polarization conditions selectively may be utilized as a total reflection surface as stated above. However, the reflecting surfaces can preferably be provided with a metallic reflecting layer or a dielectric reflecting layer because of the occurrence of a phase deviation of the S polarized beam and the P polarized beam. A metallic reflecting layer (e.g. Al- or Ag-deposited layer) is free from a phase deviation and is fit for practical use, but it has a disadvantage that the reflectance thereof is about 90%, resulting in a slight fall in the quantity of light. A dielectric reflecting layer (e.g. titania- and zirconia-laminated layer), on the other hand, is expensive but its reflectance is 100%, which means that it is excellent in terms of efficiency.

As stated above, a laser interferometric measuring machine of a differential type is affected by any external disturbances such as temperature changes or the like due to its long optical path and a combination of complicated optical systems employing polarized beam splitters. Thus, the measurement taken by such a device has been unstable and such measurement accuracy has not been improved. Owing to the invention, however, it has become possible to offer a laser interferometric measuring machine wherein the length of an optical path in the interferometer is short despite an optical arrangement of a differential type, wherein the number of optical elements is decreased and thereby is stable against disturbance, wherein measuring accuracy is improved, and wherein the device is easy to operate.

The construction for achieving the second, third and fourth objects of the invention will be explained as follows, referring to FIGS. 22–26.

Figure 22:
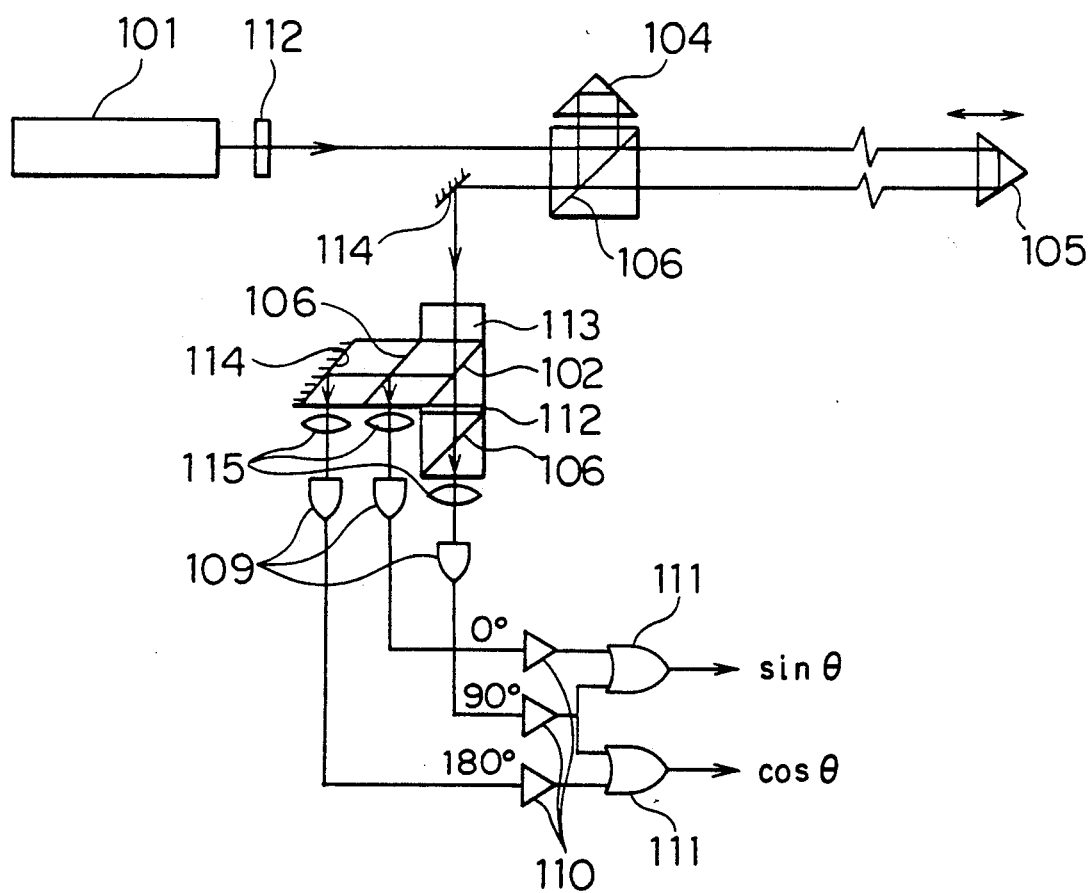
FIGS. 22 and 23 represent schematic diagrams showing examples of laser-based measuring machines which achieve the second, third and fourth objects of the invention.
Figure 23:
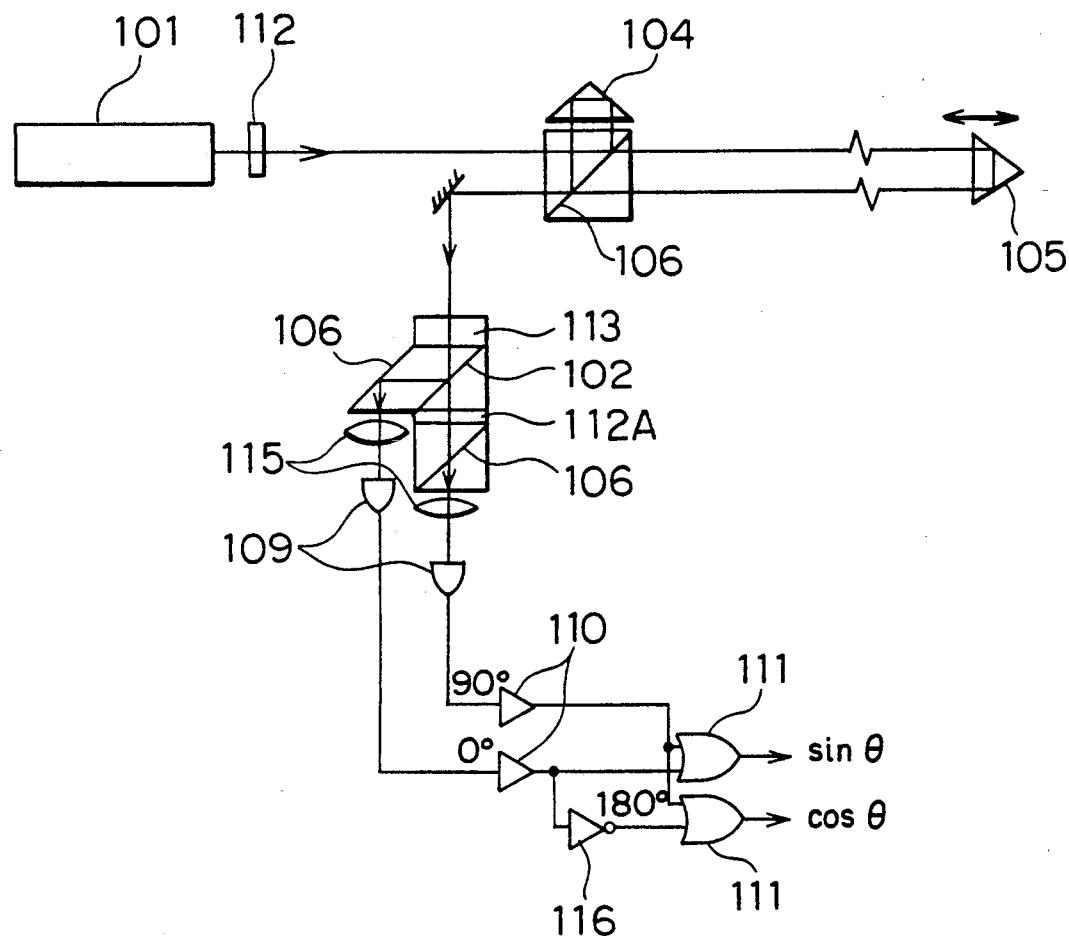
Figure 24:
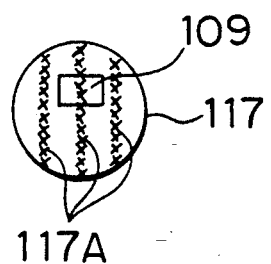
FIG. 24 is a diagram showing the relation between an interference beam and a detector.
Figure 25:
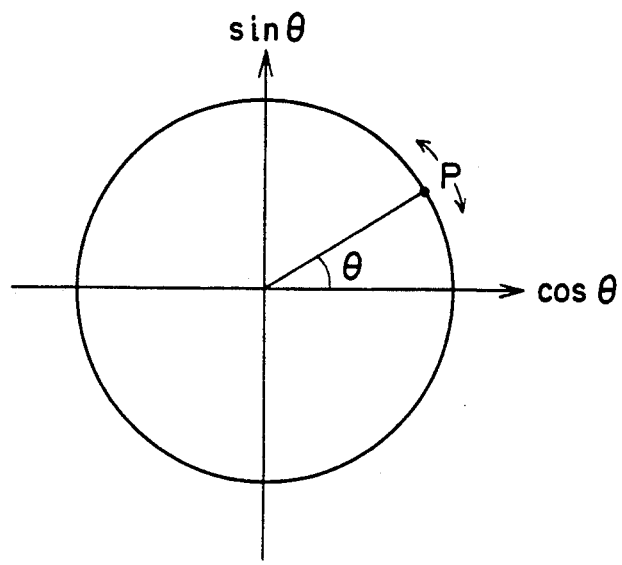
FIG. 25 is a Lissajous's figure of two kinds of interference fringe signals in the case of a phase difference of $\pi/2$ radians.
Figure 26:
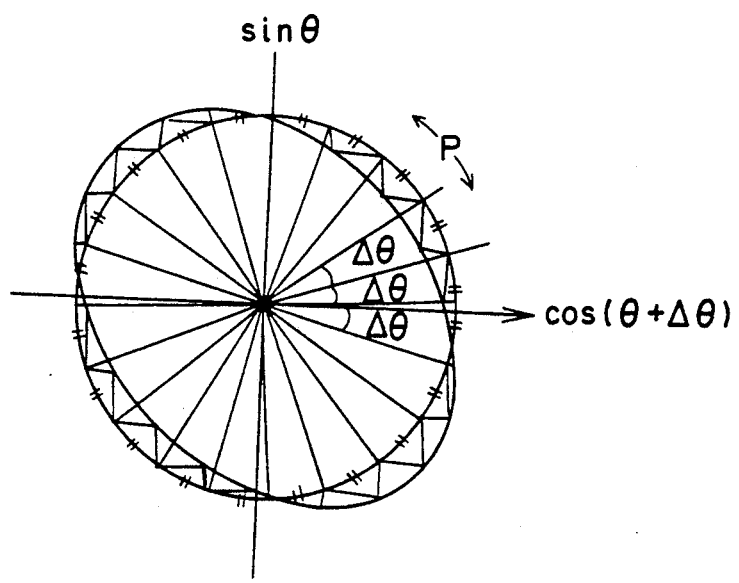
FIG. 26 is a Lissajous's figure showing an occasion wherein a phase difference is deviated from $\pi/2$ to $\Delta\theta$.

FIG. 22 and FIG. 23 represent schematic diagrams showing respectively examples of laser-based measuring machines of the present invention. FIG. 24 is a diagram showing the relationship between an interference beam and a detector. FIG. 25 is a Lissajous's figure of two kinds of interference fringe signals in the case of a phase difference of $\pi/2$ radians. FIG. 26 is a Lissajous's figure showing an occasion wherein a phase difference is deviated from $\pi/2$ to $\Delta\theta$.

Figure 27:
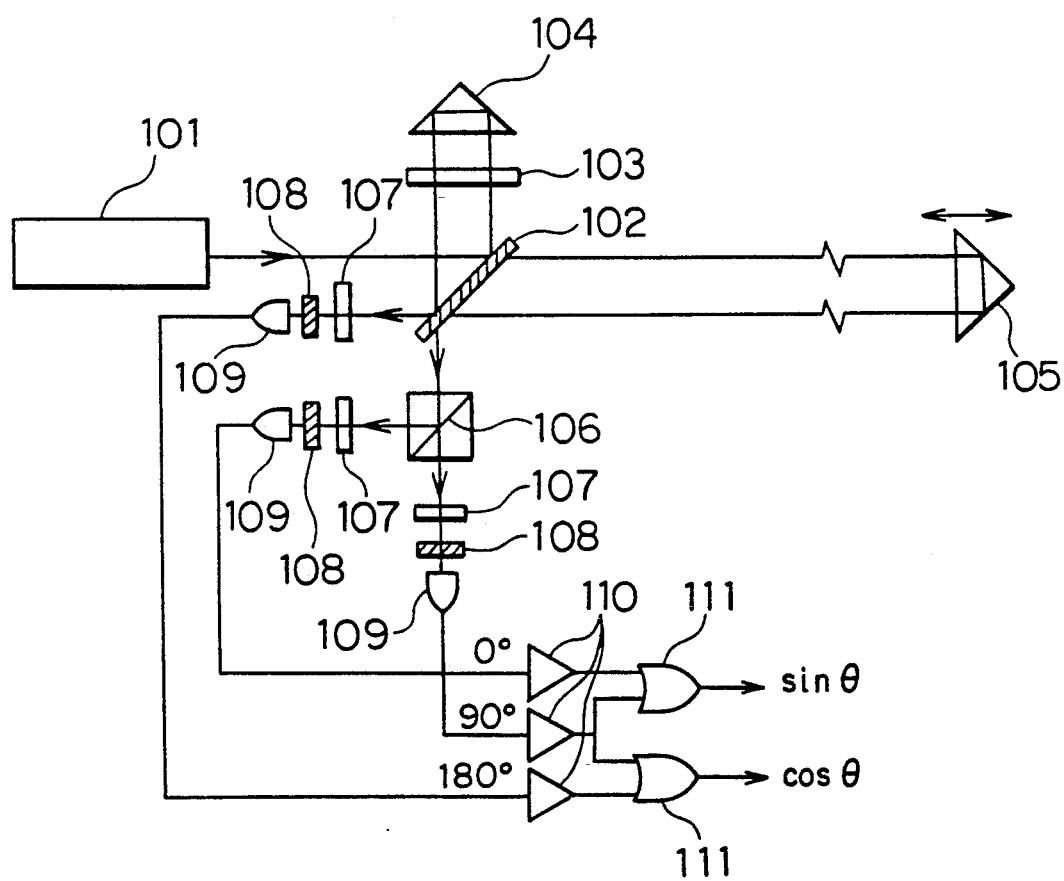
FIG. 27 is a schematic diagram showing an example of a conventional measuring machine of an interference fringe-counting type.

In FIGS. 22 and 23, each item which has been given the same number as in FIG. 27 has the same function as the equivalent item in FIG. 27. The numeral 112 represents a $\lambda/4$ plate, 112A represents a wavelength plate of $\lambda/4$ or more, for example of $\lambda/2$, 113 is a beam-45°-rotating plate, 114 is a 45°-reflecting plane, 115 is an image-forming lens, and 116 is a reflection-amplifier.

Namely, in the laser-based measuring machine shown in FIGS. 22 and 23, a linearly polarized beam from a stabilized laser 101 is circularly polarized by the $\lambda/4$ plate 112 and the circularly polarized beam is split by the polarized beam splitter 106 into a linearly polarized reference beam for a reference beam path and a measuring beam for a measuring beam path. Both the reference beam and the measuring beam cross at right angles and then they are aligned to be coaxial. Thereby the reference beam and the measuring beam are polarized equally by polarized beam splitter 106 for obtaining an interference beam. Thus, it is easy to make both beams equal in terms of intensity and to obtain an interference beam whose interference fringes are clear. Further, in the laser-based measuring machine mentioned above, the beams aligned to be coaxial by polarized beam splitter 106 are reflected on a 45° mirror plane or on 45° reflecting plane 114 such as a total reflection plane to be deflected, thereby the flexibility of positioning of optical elements which split optically a beam into reference beams is increased. Aforesaid points are the difference between the laser-based measuring machine in FIG. 27 and those in FIGS. 22 and 23.

Further, in the laser-based measuring machine shown in FIG. 22, the prism-structure optical elements, each being of a disk form, triangular-side-shaped form, square form, or of a parallelogram form and having beam-45°-rotating plate 113 of the optical elements for obtaining 3-phase interference beam whose interference fringe phases are deviated by 90° in succession, beam splitter 102, $\lambda/4$ plate 112 for one of two beams separated by beam splitter 102, and polarized beam splitter 106, polarized beam splitter 106 for the other of two beams separated by beam splitter 102 and 45°-reflecting plane 114 for the beam passing through aforesaid polarized beam splitter 106, are caused to be united solidly in a manner that adjacent optical elements are in contact side by side in the sequence of an optical path. Further, in the laser-based measuring machine, beam-rotating plate 113 is arranged so that the side of beam splitter 112 can be positioned to be parallel with that of polarized beam splitter 106, that is, for obtaining both reference beam and measuring beam aligned to be coaxial each other. Therefore, positioning of a plurality of optical elements for obtaining optically interference beam with three phases is extremely easy and accurate compared with that in the laser-based measuring machine shown in FIG. 27. Thus, it is easy to obtain an interference beam with three phases whose interference fringe phases are deviated by 90° in succession.

Further, in the laser-based measuring machine shown in FIG. 23, the prism-structure optical elements, each being of a disk form, a triangular-side-shaped form, a square form or of a parallelogram form and having beam-45°-rotating plate 113 of optical elements for obtaining 2-phase interference beam whose interference fringe phases are deviated by 90° in succession, beam splitter 102, wavelength plate 112A such as a $\lambda/4$ plate for one of two beams separated by beam splitter 102 and polarized beam splitter 106, and polarized beam splitter 106 for the other of two beams separated by beam splitter 102, are caused to be united solidly in a manner that adjacent optical elements are in contact side by side in the sequence of an optical path. Compared with a laser-based measuring machine shown in FIG. 1, therefore, it is easier, due to absence of an optical element having 45°-reflecting plane 114, to unite the optical elements. Furthermore, positioning of image-forming lens 115 for an interference beam and detector 109 is easier because the positioning is only for a 2-phase interference beam.

In laser-based measuring machines shown in FIGS. 22 and 23, interference beams are formed on detector 109 through image-forming lens 115 for the purpose of obtaining clear interference fringes. For that purpose, it is important to determine the positions of both the image-forming lens 115 and the detector with respect to the interference beams so that interference fringe portion 117A appearing in interference beam 117 can be covered by detector 109. In this connection, the laser-based measuring machine shown in FIG. 22 requires the positioning of both image-forming lens 115 and detector 109 for each of the interference beams of the three phases, while the laser-based measuring machine in FIG. 23 requires the same positioning for the interference beams of only two phases. This means that the latter is easier than the former both in time and labor by one phase.

Further, in the laser-based measuring machine shown in FIG. 23, when the phase difference between interference beams of two phases is exactly 90°, it is possible to obtain interference fringe signals of three phases whose phases are deviated exactly by 90°, because interference fringe signals with a difference of 180° are generated by reversal amplifier 116 from signals detected from an interference beam of one phase among them.

As stated above, it is relatively easy to obtain interference beams whose phases are deviated by 90° in succession in the laser-based measuring machines shown in FIGS. 22 and 23. Therefore, interference fringe signals which fluctuate with Sin θ and Cos θ, namely the interference fringe signals whose Lissajous's figure is a form of a circle as shown in FIG. 25, are easily obtained. From such interference fringe signals with Sin θ and Cos θ, the change or difference between interference fringes in the measuring beam path can also be measured easily and accurately, provided, however, that optical elements for obtaining interference beams by splitting a beam, wherein a reference beam and a measuring beam are aligned to be coaxial, are united accurately. When optical elements are not united accurately, the phase difference between interference beams obtained deviates from 90° and, thereby, interference fringe signals of two phases obtained finally change with Sin θ and Cos (θ+Δθ), resulting in their Lissajous's figure of an elliptic shape as shown in FIG. 26. From such interference fringe signals with Sin θ and Cos (θ+Δθ), periodical errors are generated, and therefore, it is difficult to measure accurately the change or difference between interference fringes in a measuring beam path.

In this connection, when wavelength plate 112A, having retardation of not less than λ/4 or preferably not less than λ/2 for an optical element splitting a beam into interference beams of two phases, or polarized beam splitter 106 located downstream thereof, is caused to be rotatable around an optical axis for adjustment in the laser-based measuring machine in FIG. 23, it is possible to make the phase difference between interference beams of two phases to be exactly 90° by rotating wavelength plate 112A or polarized beam splitter 106 around an optical axis for adjustment. In the present example, therefore, it is possible to obtain interference fringe signals which change with Sin θ and Cos θ more easily.

The present invention is not limited to the examples stated above, and it may be the one wherein optical elements in the optical path for obtaining a beam in which a reference beam and a measuring beam are aligned to be coaxial are the same as those in a conventional laser-based measuring machine. Further, in the one wherein a beam is split into interference beams of two phases, it may be the one wherein interference fringe signals of three phases are not generated by a reversal amplifier, because less electric noise is cause when interference beams are guided through an optical fiber or the like to a detector of a measurement processing device.

In the laser-based measuring machine of the invention, a plurality of optical elements including a beam-45°-rotating plate splitting a beam into interference beams of two phases or three phases are totally or partially united solidly in a manner that adjacent optical elements are in contact side by side. Therefore, a plurality of optical elements can be easily and accurately positioned and thereby interference beams whose phases are deviated by 90° accurately can be easily obtained.

What is claimed is:

1. A laser interferometric measuring apparatus for measuring the position of an article, comprising:

means for emitting a polarized reference beam and a polarized measuring beam;

optical means for receiving the measuring beam and the reference beam from the emitting means and for transmitting the measuring and reference beams in a measuring direction;

movable reflecting means movable in the measuring direction locatable at the position of an article, for reflecting the measuring beam into the optical means;

fixed reflecting means located at a predetermined position in the measuring direction, for reflecting the reference beam into the optical means;

the optical means including a first surface to selectively reflect or transmit the measuring beam and the reference beam therethrough in accordance with the polarization condition of the measuring and reference beams and a second surface to completely reflect the measuring and reference beams, each one of the first and second surfaces of the optical means being positioned so as to face both the movable and the fixed reflecting means so that each one of the first and second surfaces receives both the measuring beam from the movable reflecting means and the reference beam from the fixed reflecting means or reflects the measuring and reference beams in the measuring direction without the measuring and reference beams being reflected on an intermediate surface between each one of the first and second surfaces and each one of the movable and fixed reflecting means, the first surface and the second surface inclined at an angle to the measuring direction, and the first and second surfaces constructed forming an angle therebetween so that each one of the first and second surfaces receives beams reflected from the other one of said first and second surfaces, whereby, when the first surface receives the measuring beam reflected from the movable reflecting means and the reference beam reflected from the fixed reflecting means, the first surface selectively reflects the beams into the second surface or transmits the beams into detecting means depending on the polarization condition of the beams, when the first surface receives the measuring beam and the reference beam reflected from the second surface, the first surface selectively reflects the beams in the measuring direction or transmits the beams into the detecting means depending on the polarization condition of the beams, when the second surface receives the measuring beam reflected from the movable reflecting means and the reference beam reflected from the fixed reflecting means, the second surface reflects the beams into the first surface, and when the second surface receives the measuring beam and the reference beam reflected from the first surface, the second surface reflects the beams in the measuring direction; and detecting means for receiving the measuring beam and the reference beam transmitted through the first surface and for comparing the beams to detect the position of the article.

2. The apparatus of claim 1, wherein the optical means comprises a corner-cube prism including the first surface and the second surface.

3. The apparatus of claim 2, further comprising a triangular prism comprising a solid transparent body having a plurality of transmitting surfaces, one of which is attached to the first reflecting surface of the corner-cube prism.

4. The apparatus of claim 3, wherein the triangular prism is adapted to be rotatable around a line normal to the reflecting surface for changing an incident direction and an exigent direction of the reference beam and the measuring beam.

5. The apparatus of claim 3, wherein one of the plurality of transmitting surfaces of the triangular prism is parallel to the transmitting surface of the corner-cube prism.

6. The apparatus of claim 3, wherein a transmitting surface of the triangular prism and the first reflecting surface of the corner-cube prism, both of which share an apex with the transmitting surface of the corner-cube prism, define an angle $\theta_2$, and the transmitting surface of the corner-cube prism and the first reflecting surface define an angle $\theta$, the angles $\theta$ and $\theta_2$ satisfying the following relation;

$$-\cos(\theta+\theta_2) = n \sin(\theta_2-\theta)$$

wherein n represents a refractive index of the corner-cube prism and the triangular prism attached thereto.

7. The apparatus of claim 3, further comprising means for converting a polarization condition of the reference beam and the measuring beam.

8. The apparatus of claim 2, wherein the reflecting surface is inclined at 45 degrees to the measurement direction.

9. The apparatus of claim 2, wherein angle $\theta$ is $\cos^{-1}(3/3)$.

10. The apparatus of claim 3, further comprising a compensation prism for changing the direction of an incident beam or an exigent beam against the transmitting surface of the triangular prism.

11. The apparatus of claim 2, wherein incident points and exigent points of the reference beam and the measuring beam on the second reflecting surface are aligned.

12. The apparatus of claim 2, wherein reflecting surfaces other than the first reflecting surface of the corner-cube prism each includes a metallic reflecting film.

13. The apparatus of claim 2, wherein reflecting surfaces other than the first reflecting surface of the corner-cube prism each includes a dielectric reflecting film.

14. The apparatus of claim 2, wherein the corner-cube prism is a corner-cube mirror comprising the first reflecting surface and the second reflecting surface connected at an apex and defining a predetermined angle therebetween.

15. The apparatus of claim 1, wherein the optical means comprises two parallel plate prisms which form the first surface and the second surface.

16. The apparatus of claim 1, further comprising means for converting a polarization condition of the reference beam and the measuring beam.

17. The apparatus of claim 1, wherein the emitting means, the optical means, the converting means and the detecting means are so arranged that the reference beam and the measuring beam emitted by the emitting means pass through the first surface and proceed to the fixed reflecting means and the movable reflecting means respectively, the reference beam reflected from the fixed reflecting means and the measuring beam reflected from the movable reflecting means are reflected on the first surface to proceed to the second surface, and are reflected on the second surface to proceed again to the fixed reflecting means and the movable reflecting means respectively, the reference beam reflected again from the fixed reflecting means and the measuring beam reflected again from the movable reflecting means are reflected on the second surface to proceed to the first surface, and thereafter the reference beam and the measuring beam pass through the first surface to proceed to the detecting means.

18. The apparatus of claim 1, wherein the emitting means, the optical means, the converting means and the detecting means are so arranged that the reference beam and the measuring beam emitted by the emitting means pass through the first surface, proceed to the second surface, and are reflected on the second surface to proceed to the fixed reflecting means and the movable reflecting means respectively, the reference beam reflected from the fixed reflecting means and the measuring beam reflected from the movable reflecting means are reflected on the second surface, proceed to the first surface and are reflected on the first surface to proceed again to the fixed reflecting means and the movable reflecting means respectively, and the reference beam reflected again from the fixed reflecting means and the measuring beam reflected again from the movable reflecting means proceed to the first surface and pass through the first surface to proceed to the detection means.

19. The apparatus of claim 1, wherein the fixed reflecting means comprises a fixed corner-cube prism and the movable reflecting means comprises a movable corner-cube prism, and wherein the emitting means, the optical means, the converting means, the fixed corner-cube prism, the movable corner-cube prism and the detecting means are so arranged that the reference beam and the measuring beam emitted by the emitting means pass through the first surface, proceed to the second surface, and are reflected on the second surface to proceed to the fixed corner-cube prism and the movable corner-cube prism respectively, and the reference beam reflected from the fixed corner-cube prism and the measuring beam reflected from the movable corner-cube prism proceed to the first surface and pass through the first surface to proceed to the detection means.

* * * * *

UNITED STATES PATENT AND TRADEMARK OFFICE
CERTIFICATE OF CORRECTION

PATENT NO. : 5,305,088

DATED : April 19, 1994

INVENTOR(S) : Hosoe

It is certified that error appears in the above-identified patent and that said Letters Patent is hereby corrected as shown below:

Claim 7, col. 19, line 23, "claim 3" should read --claim 2--.

Claim 9, col. 19, line 30, "$Cos^{-1}(3/3)$" should read --$Cos^{-1}(\sqrt{3/3})$--.

Abstract, line 3, "includs" should read --includes--, and "surface" should read --surface,--;

line 5, "beam" should read --beam,--;

line 8, after "prism", insert --are--;

line 12, "mirror respectively" should read --mirror, respectively,--;

line 13, "surface," should read --surface. The corner-cube prism--; and

UNITED STATES PATENT AND TRADEMARK OFFICE
CERTIFICATE OF CORRECTION

PATENT NO. : 5,305,088
DATED : April 19, 1994
INVENTOR(S) : Hosoe

It is certified that error appears in the above-indentified patent and that said Letters Patent is hereby corrected as shown below:

Line 16, "surface and" should read --surface, and it--.

Signed and Sealed this

Twenty-ninth Day of November, 1994

Attest:

BRUCE LEHMAN

*Attesting Officer*     *Commissioner of Patents and Trademarks*